(12) United States Patent
Neumann et al.

(10) Patent No.: US 8,783,132 B2
(45) Date of Patent: Jul. 22, 2014

(54) STEERING WHEEL ASSEMBLY FOR A MOTOR VEHICLE

(75) Inventors: Delf Neumann, Berlin (DE); Christian Schreiber, Ahrensfelde (DE)

(73) Assignee: Takata-Petri AG, Aschaffenburg (DE)

( * ) Notice: Subject to any disclaimer, the term of this patent is extended or adjusted under 35 U.S.C. 154(b) by 525 days.

(21) Appl. No.: 12/676,858

(22) PCT Filed: Sep. 8, 2008

(86) PCT No.: PCT/DE2008/001527
§ 371 (c)(1),
(2), (4) Date: Mar. 5, 2010

(87) PCT Pub. No.: WO2009/030223
PCT Pub. Date: Mar. 12, 2009

(65) Prior Publication Data
US 2010/0218641 A1    Sep. 2, 2010

(30) Foreign Application Priority Data
Sep. 6, 2007   (DE) .......................... 10 2007 043 008

(51) Int. Cl.
*B60Q 1/00* (2006.01)
*B62D 1/04* (2006.01)

(52) U.S. Cl.
USPC ............................................................ 74/552

(58) Field of Classification Search
USPC .............. 74/552, 555–558; 29/894.1; 116/31; 340/575
IPC ................................................. B62D 1/04,1/06
See application file for complete search history.

(56) References Cited

U.S. PATENT DOCUMENTS 3,485,974 A  *  12/1969  Wolf et al. .................. 200/61.57
4,835,512 A       5/1989  Bratton
5,895,115 A  *   4/1999  Parker et al. ................... 362/511

(Continued)

FOREIGN PATENT DOCUMENTS

DE    200 18 732 U1    2/2001
DE    200 14 731 U1    2/2002

(Continued)

OTHER PUBLICATIONS

Machine translation of JP2001055149 A, generated Aug. 30, 2012 by the translation service on the JPO website.*

(Continued)

*Primary Examiner* — James Pilkington
*Assistant Examiner* — Richard Urbanski
(74) *Attorney, Agent, or Firm* — Fitch, Even, Tabin & Flannery, LLP

(57) ABSTRACT

The invention relates to a steering wheel assembly for a motor vehicle, having a steering wheel for steering the motor vehicle, wherein the steering wheel comprises a steering wheel rim, by means of which it can be actuated, and having a display device arranged on the steering wheel rim for displaying driving information, wherein the display device is fastened to the steering wheel rim by means of fastening means, wherein the steering wheel rim comprises a base body, that is at least partly surrounded by a material, that is particularly softer than the material of the base body, and wherein the display device is fastened to the base body by means of the fastening means, and wherein the fastening means comprise at least one fastening region formed on the base body.

15 Claims, 20 Drawing Sheets

(56) References Cited

U.S. PATENT DOCUMENTS

| | | | |
|---|---|---|---|
| 6,651,526 B1 * | 11/2003 | Imaizumi et al. | 74/552 |
| 6,817,100 B2 * | 11/2004 | Mori et al. | 29/894.1 |
| 7,143,663 B2 * | 12/2006 | Menaldo et al. | 74/552 |
| 7,377,186 B2 | 5/2008 | Duval | |
| 2004/0045396 A1 * | 3/2004 | Hosokawa et al. | 74/552 |

FOREIGN PATENT DOCUMENTS

| | | |
|---|---|---|
| DE | 101 13 493 A1 | 9/2002 |
| DE | 10 2005 013 202 A1 | 9/2006 |
| FR | 2 744 976 A1 | 8/1997 |
| JP | 2001-055149 A | 2/2001 |
| JP | 2007-153048 A | 6/2007 |
| WO | WO 2006076903 A1 * 7/2006 ............. B60K 35/00 |  |

OTHER PUBLICATIONS

English translation of the International Preliminary Report on Patentability (Chapter I or Chapter II of the Patent Cooperation Treaty) from the International Bureau of WIPO for International Application No. PCT/DE2008/001527 dated Apr. 15, 2010, 18 pages.

Office Action issued in counterpart Japanese Application No. 2010-523275 dated Jun. 5, 2012 (2 pages) and an English translation of the same (1 page).

* cited by examiner

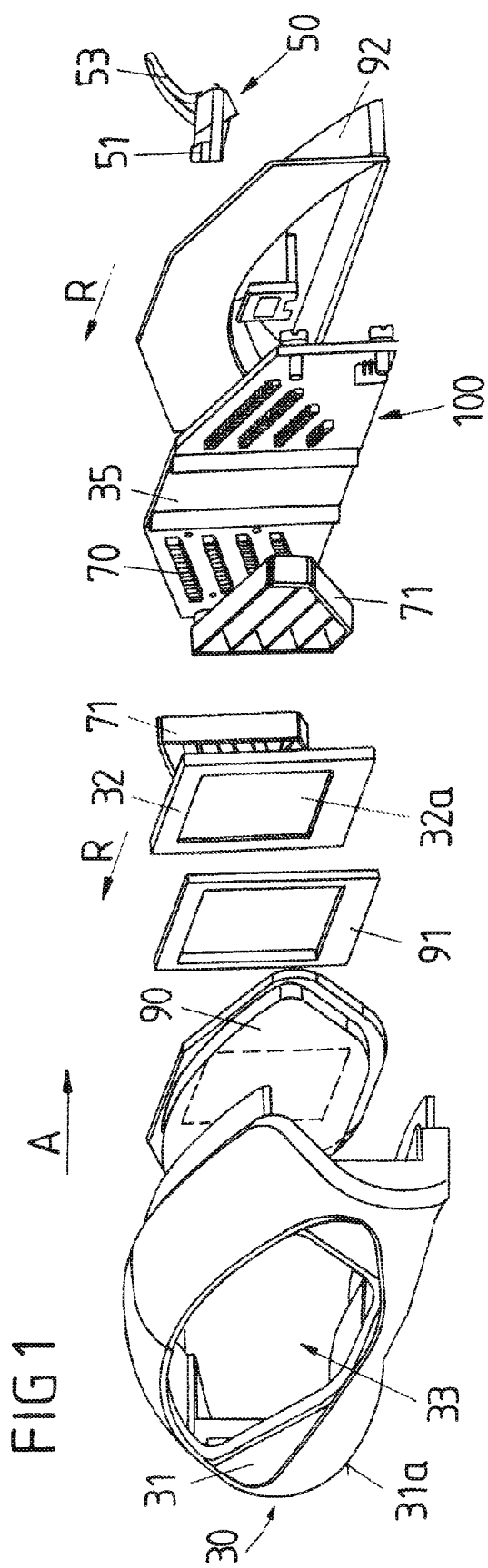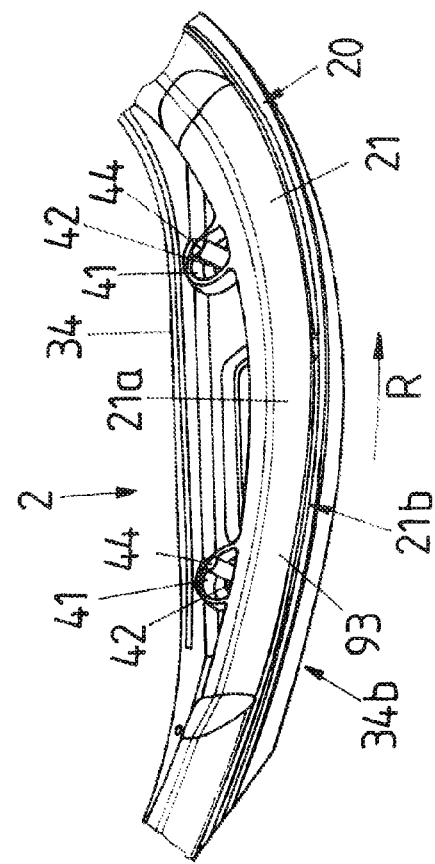

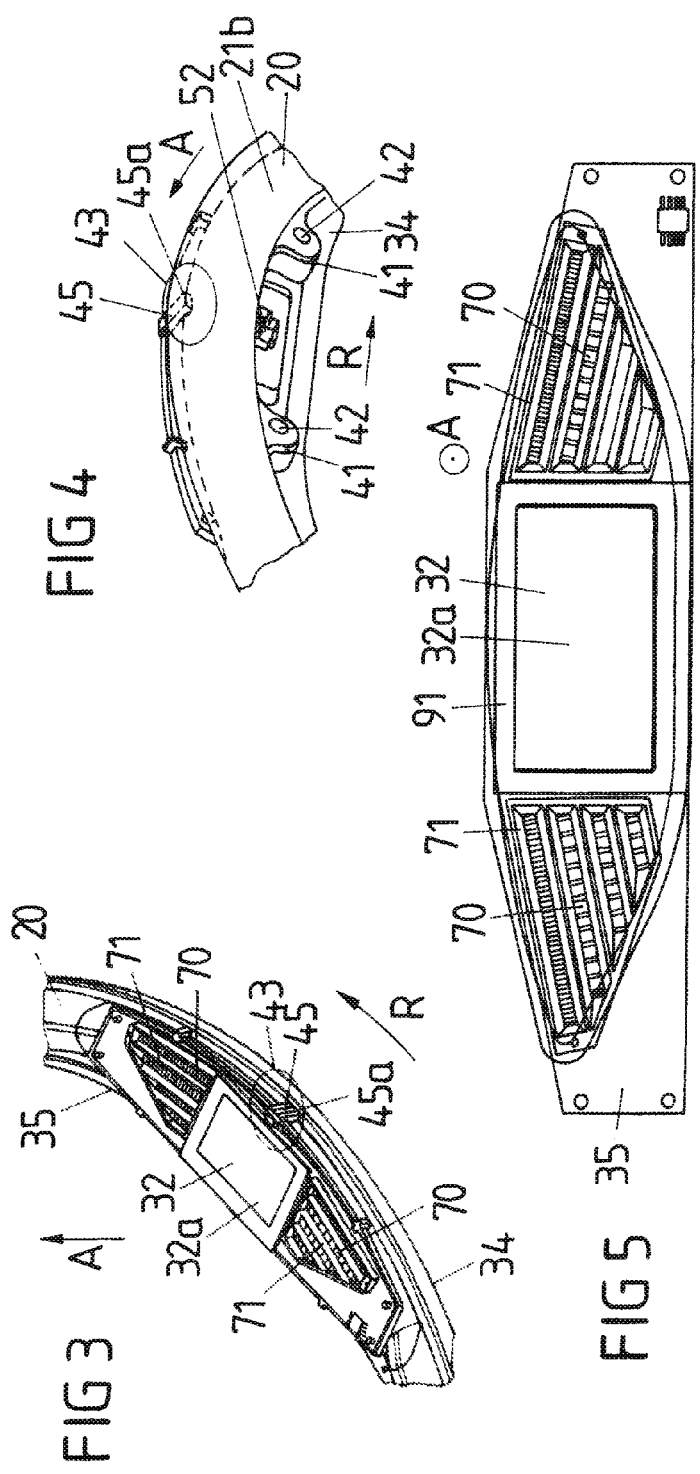
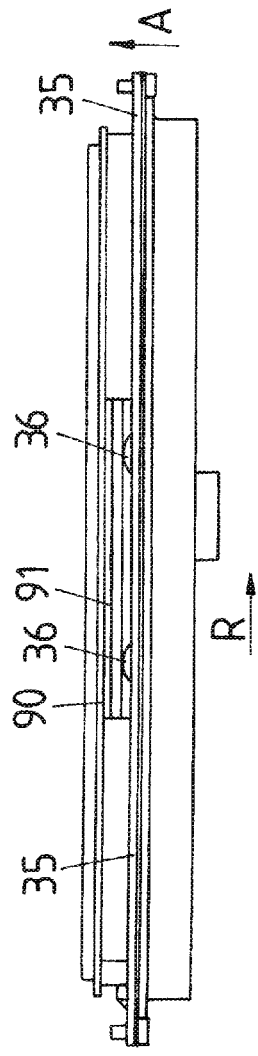

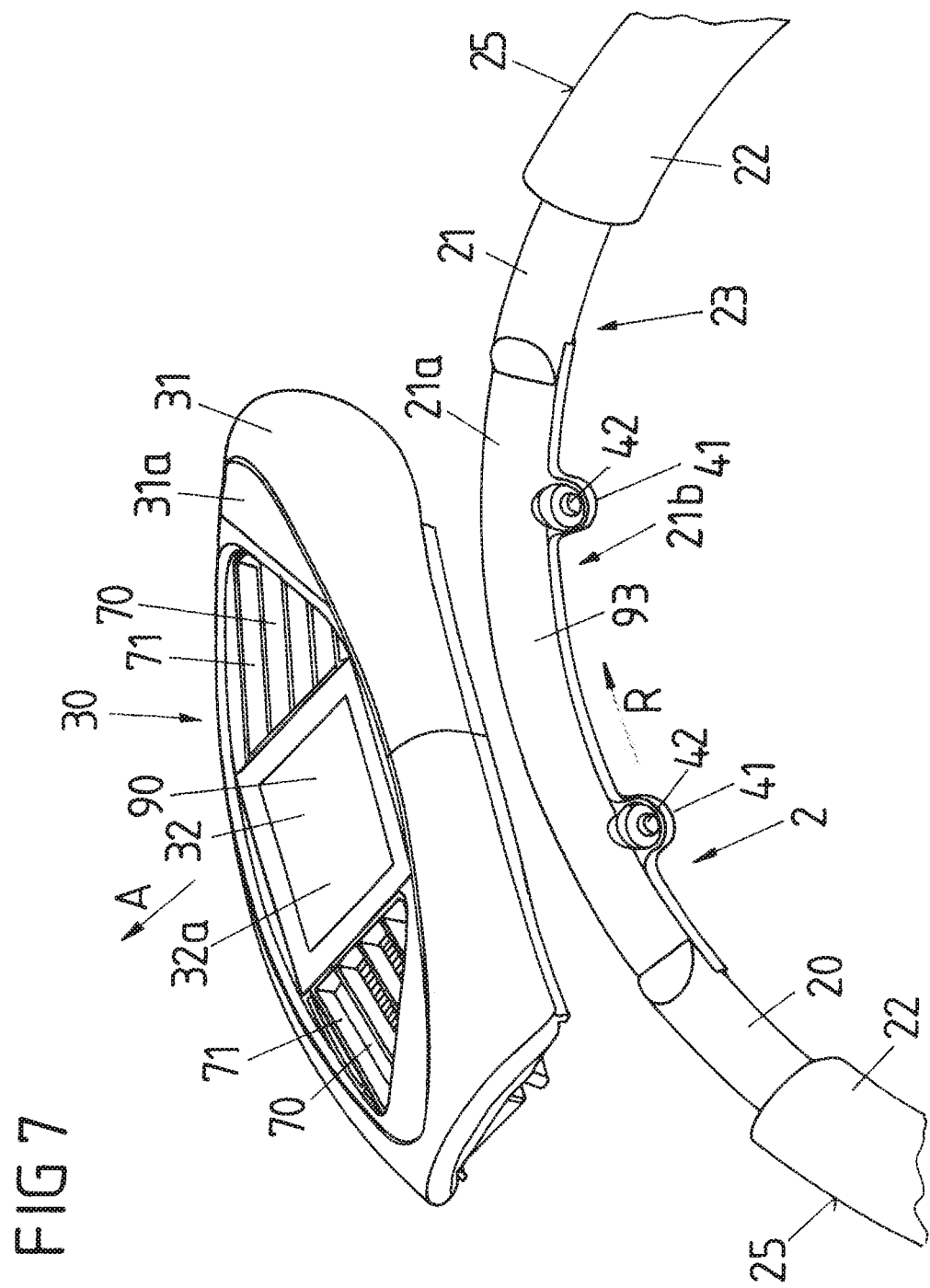

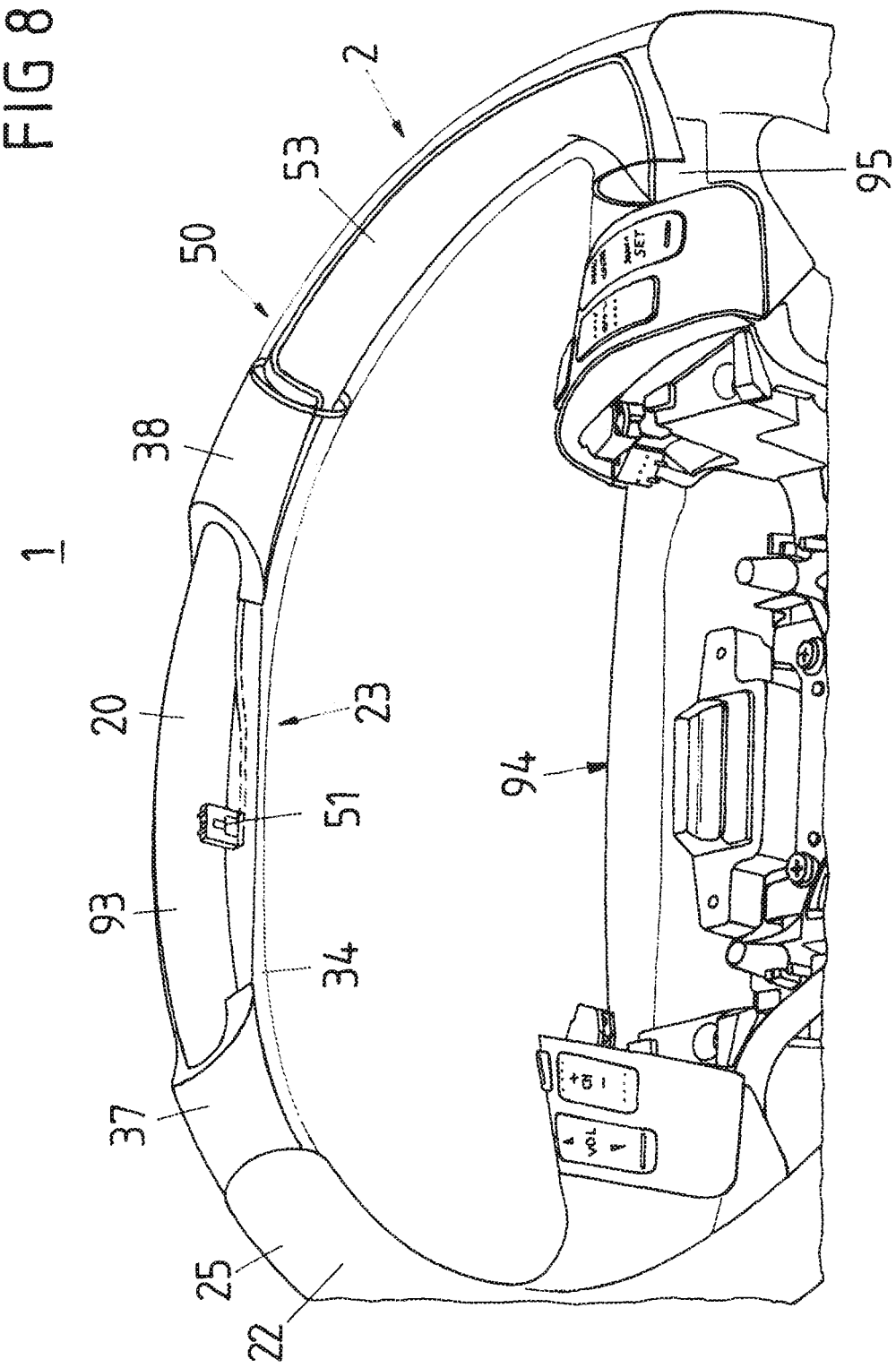

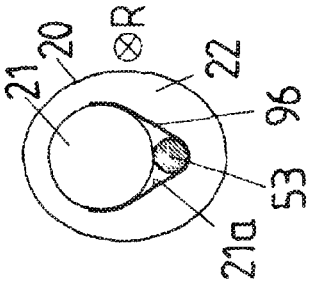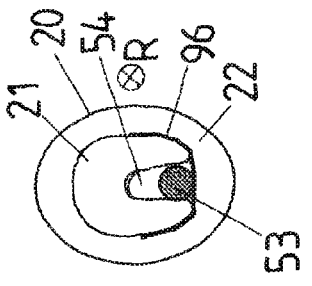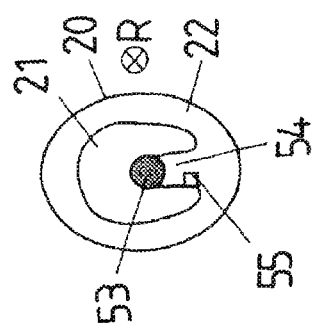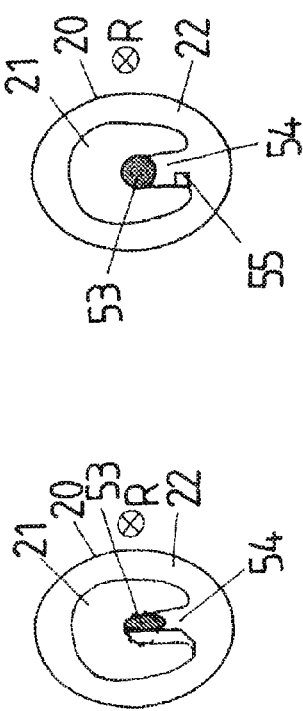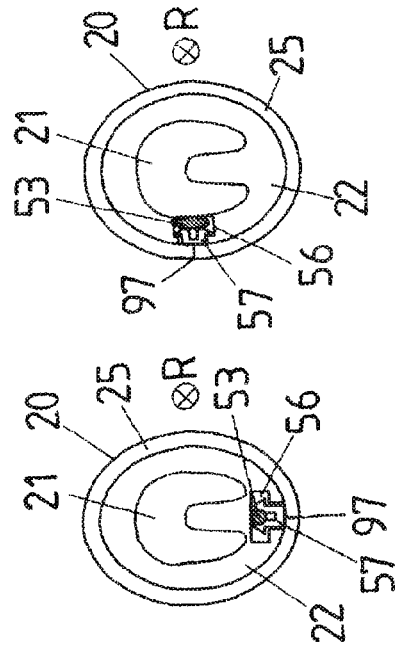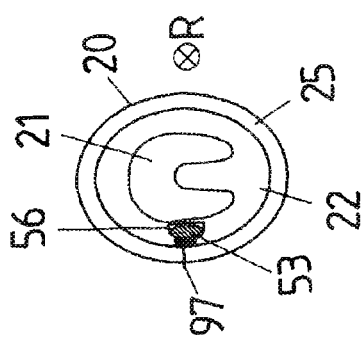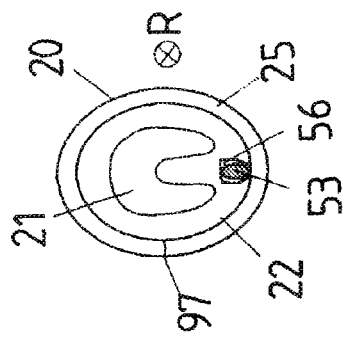

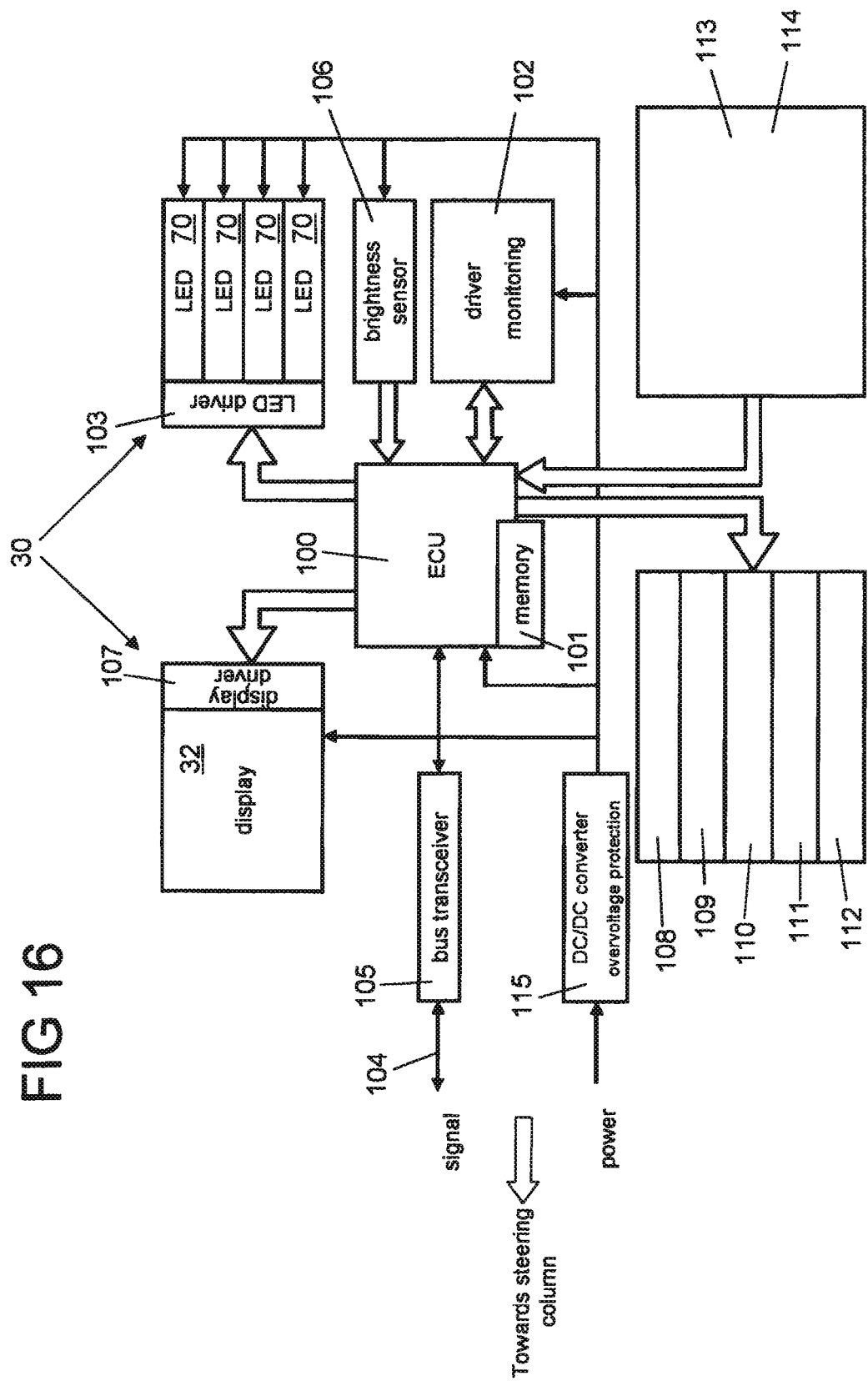

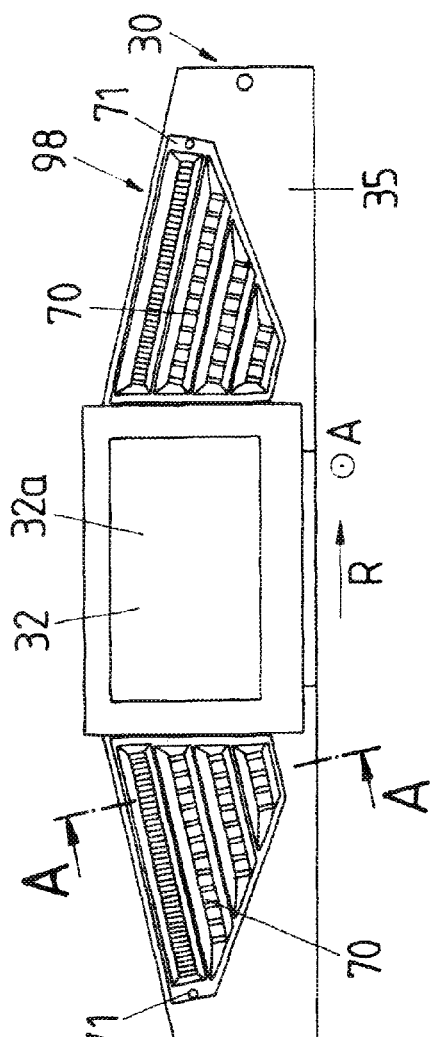
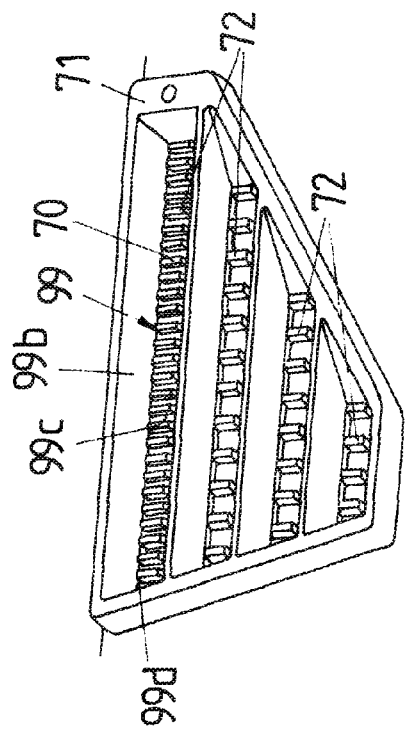
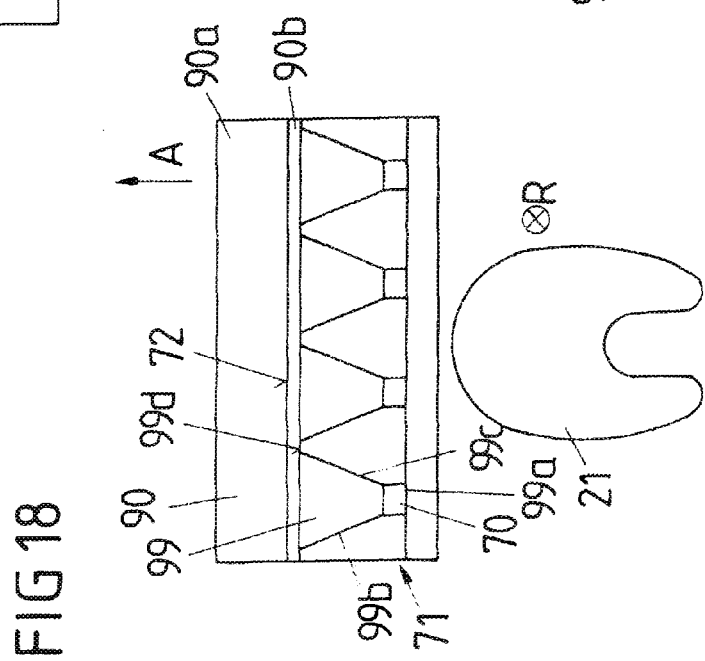

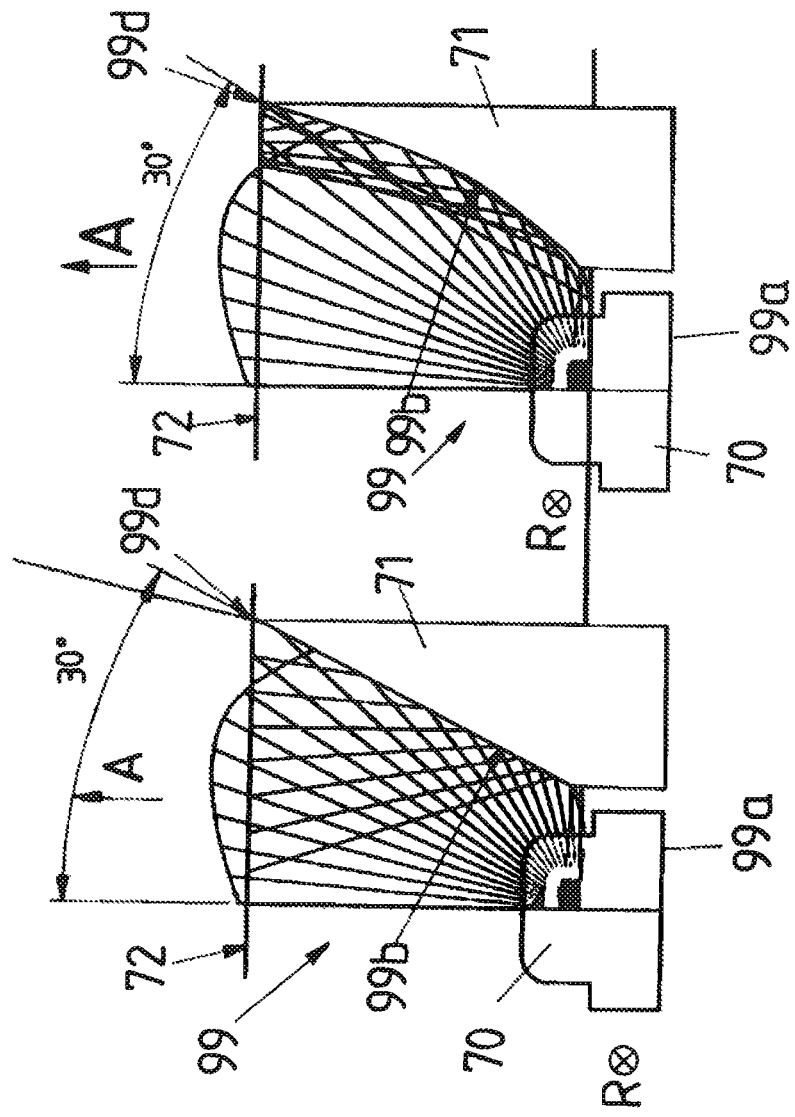

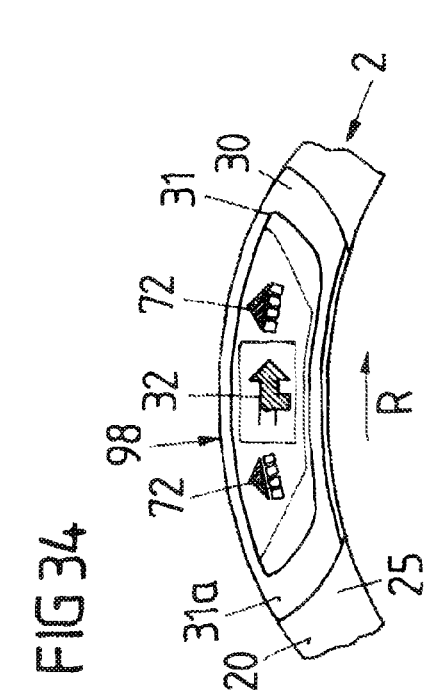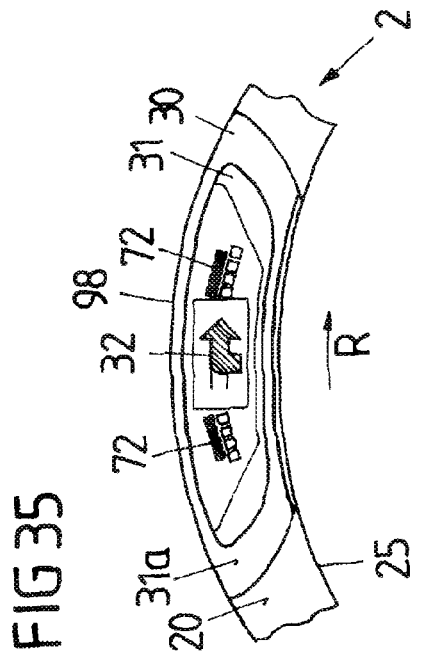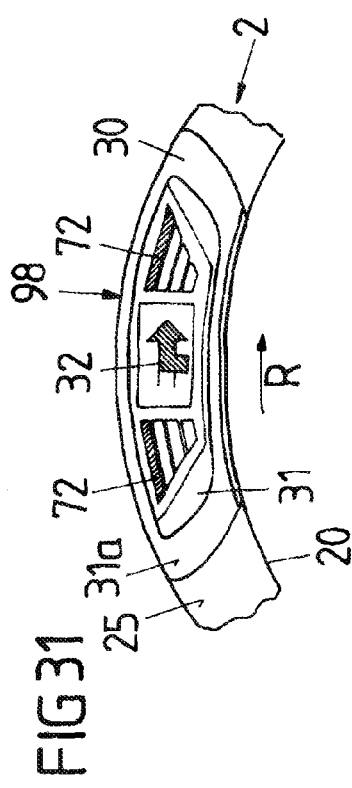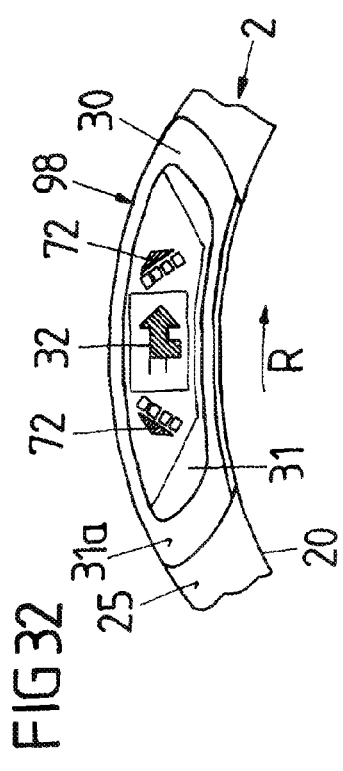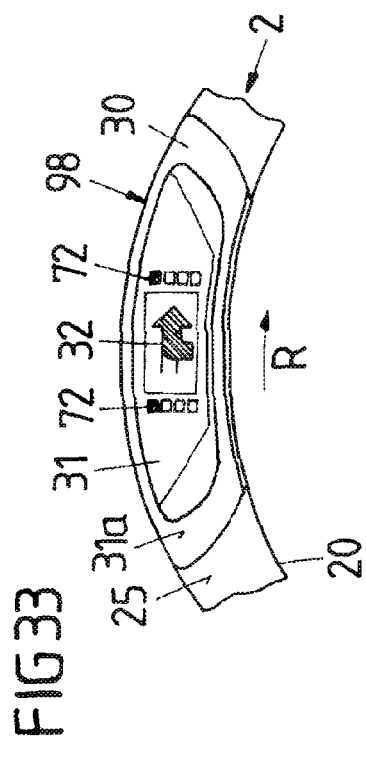

STEERING WHEEL ASSEMBLY FOR A MOTOR VEHICLE

CROSS-REFERENCE TO RELATED APPLICATIONS

This application is a U.S. national phase application filed under 35 U.S.C. §371 of International Application PCT/DE2008/001527, filed on Sep. 8, 2008, designating the United States, which claims priority from German Application 10 2007 043 008.8, filed Sep. 6, 2007, which are hereby incorporated herein by reference in their entirety.

BACKGROUND

The invention relates to a steering wheel assembly for a motor vehicle.

It would be advantageous to provide a steering wheel assembly that increases safety and comfort of the motor vehicle.

SUMMARY

One disclosed embodiment relates to a steering wheel assembly for a motor vehicle, comprising a steering wheel for steering the motor vehicle, wherein the steering wheel comprises a steering wheel rim, by means of which it can be actuated, and a display device arranged on the steering wheel rim for displaying driving information, wherein the display device is fastened to the steering wheel rim by means of fastening means, and wherein the steering wheel rim comprises a base body (skeleton), that is at least partly surrounded by a material (casing, e.g. out of a foam, leather or artificial leather), that is particularly softer than the material of the base body, and wherein the display device is fastened to the base body by means of the fastening means, and wherein the fastening means comprise at least one fastening region (fastening structure) formed on the base body.

Another embodiment relates to a method for producing a steering wheel assembly.

The method comprises the steps of:
- surrounding a base body (steering wheel base body) of a steering wheel rim with a base body casing (e.g. a foam around the base body—also denoted as steering wheel skeleton), in a way, that the base body casing comprises a recess (clearance),
- arranging a first part, particularly in the form of a lower shell, on the base body in the recess or in the region of the recess,
- particularly arranging a second and third part in the form of a second upper and a third upper shell in the region of the recess on a side of the base body that faces away from the first part,
- arranging a display device for displaying driving information in the recess, and
- connecting a covering part, particularly in the form of an upper first shell of the display device, to the lower shell.

In a further embodiment steering wheel assembly is provided, having a steering wheel for steering the motor vehicle, wherein the steering wheel comprises a steering wheel rim by means of which it can be actuated, and having a display device arranged on the steering wheel rim for displaying driving information, wherein the control unit for controlling the display device is integrated into the steering wheel.

A further embodiment relates to a control unit integrated into the steering wheel that is not necessarily provided for controlling the display device, but is generally designed to autonomously process vehicle information.

Furthermore, an embodiment relates to a steering wheel assembly for a motor vehicle having a steering wheel for steering the motor vehicle, wherein the steering wheel comprises a steering wheel rim, by means of which it can be actuated, and having a display device arranged on the steering wheel rim for displaying driving information.

According to a further embodiment a steering wheel assembly for a motor vehicle is provided, having a steering wheel for steering the motor vehicle, wherein the steering wheel comprises a steering wheel rim, by means of which it can be actuated, having a display device arranged on the steering wheel rim for displaying driving information. Particularly, furthermore, a light emitting element of the display device as well as a reflector element for at least partly reflecting the light emitted by the light emitting element is provided.

According to a further embodiment a steering wheel assembly for a motor vehicle is provided, having a steering wheel for steering the motor vehicle, wherein the steering wheel comprises a steering wheel rim, by means of which it can be actuated, having a display device arranged on the steering wheel rim for displaying driving information. Particularly, furthermore, a light emitting element of the display device as well as a reflector element for at least partly reflecting the light emitted by the light emitting element is provided.

According to a further embodiment, a steering wheel assembly for a motor vehicle is provided, having a steering wheel for steering the motor vehicle, wherein the steering wheel comprises a steering wheel rim, by means of which it can be actuated, and having a display device arranged on the steering wheel rim for displaying driving information, and having a display of the display device for generating an optical signal for representing the driving information, wherein the steering wheel rim is designed such that ambient light for background lighting can get on the side of the display facing away from the display side.

It is to be understood that both the foregoing general description and the following detailed description are exemplary only, and are not restrictive of the invention as claimed.

BRIEF DESCRIPTION OF THE DRAWINGS

These and other features, aspects and advantages of the present invention will become apparent from the following description, appended claims, and the exemplary detailed description of embodiments of the invention.

FIG. 1 shows an exploded view of a display device of a steering wheel assembly.

FIG. 2 shows a fragmentary, perspective view of a base body of a steering wheel rim and a lower shell of a display device of the kind shown in FIG. 1 arranged thereon.

FIGS. 3-4 show perspective, fragmentary views of a display device of the kind shown in FIG. 1, that is connected to the base body by means of a clip connection.

FIGS. 5-6 show fragmentary views of a display device of the kind shown in FIG. 1 having a display that is connected to the base body via an elastic fastening.

FIG. 7 shows an exploded view of a steering wheel rim having a base body that is exposed in sections, to which base body the shown display device according to FIG. 1 is to be fastened.

FIG. 8 shows a fragmentary, perspective view of a steering wheel having an electronic connection between the hub body and an installation space for a display device according to FIG. 1, which installation space is provided on an upper steering wheel rim.

FIGS. 9-15 show schematical sectional views of a steering wheel rim of the kind shown in FIG. 8 having different fastening means for the electronic connection.

FIG. 16 shows a schematical block diagram of a control unit (ECU) according to the invention.

FIG. 17 shows a schematical plan view onto a display device according to the invention having a reflector means for a light emitting element (e.g. a LED).

FIG. 18 shows a cut along the line A-A of FIG. 17.

FIG. 19 shows a schematical, perspective view of the reflector means show in FIG. 17.

FIGS. 20-21 show details of FIG. 18.

FIGS. 31-36 show fragmentary plan views onto display devices according to the invention.

DETAILED DESCRIPTION

Figure 23:
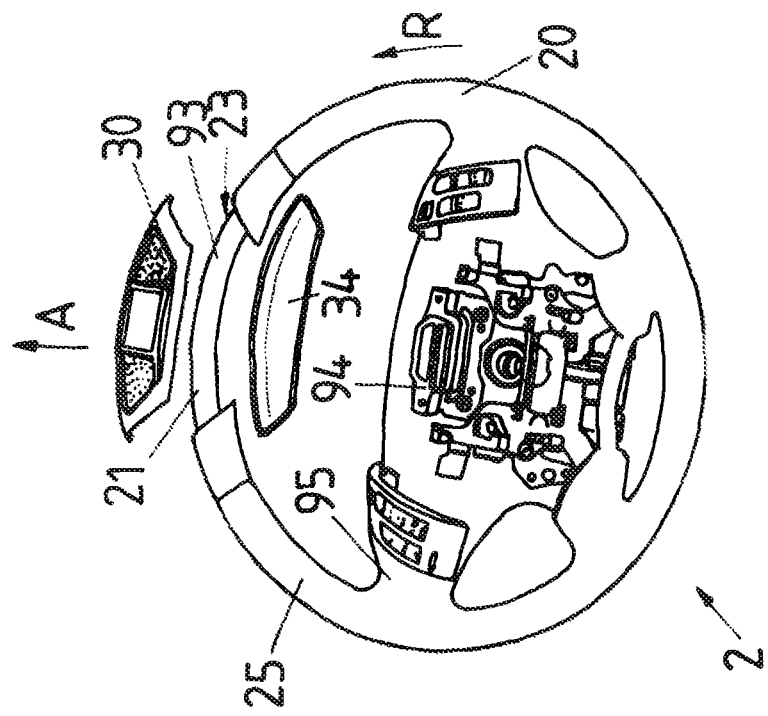
FIGS. 22-24 show perspective views of steering wheels and display devices that are to be fastened thereto.

According to a first aspect of the invention, a steering wheel assembly for a motor vehicle, comprising a steering wheel for steering the motor vehicle is provided, wherein the steering wheel comprises a steering wheel rim, by means of which it can be actuated, and a display device arranged on the steering wheel rim for displaying driving information, wherein the display device is fastened to the steering wheel rim by means of fastening means, and wherein the steering wheel rim comprises a base body (skeleton), that is at least partly surrounded by a material (casing, e.g. out of a foam, leather or artificial leather), that is particularly softer than the material of the base body, and wherein the display device is fastened to the base body by means of the fastening means, and wherein the fastening means comprise at least one fastening region (fastening structure) formed on the base body.

In this respect it is pointed out, that already a steering wheel assembly having a steering wheel for steering the motor vehicle, wherein the steering wheel comprises a steering wheel rim by means of which it can be actuated, and a display device arranged on the steering wheel rim for displaying driving information, wherein the display device is fastened to the steering wheel rim by means of fastening means, is of particular advantage and can be prosecuted as an independent object of invention and can be further developed by the features describe above or in following.

In an aspect of the invention, the at least one fastening region (fastening structure) protrudes from the base body and comprises at least one through-opening, particularly in the form of a borehole, for providing a form-fit and/or force-fit connection between the display device and the base body. Or, in other words, the fastening structures can be formed eyelet-like and can comprise at least one borehole for providing said connection.

For protecting the components of the display device the latter comprises an upper first shell having a visible surface facing outwards, that—with respect to a built-in state of the steering wheel assembly—faces a driver. Particularly, the display device comprises at 10 least one display for generating optical signals, wherein the upper first shell particularly comprises a cut-out or a transparent or a translucent region, so that the display arranged below the shell or the generated optical signals, respectively, are visible. Translucency means light-transmissive or partly light-transmissive, in contrast to transparent, which denotes a vision and image transmissibility.

In an aspect of the invention, the upper first shell is fastened to the base body by means of a pin reaching through the through-opening of the fastening region, wherein the pin is particularly formed as a screw. In this way, a stable connection is provided between said shell and the base body which prevents said shell (and the display device) from slipping along a direction running across the peripheral direction (extension direction) of the steering wheel rim, and along the peripheral direction of the steering wheel rim, along which the steering wheel rim extends.

Furthermore there is provided a lower shell having a visible surface facing outwards, that faces away from the surface of the upper first shell, wherein particularly also said lower shell is fastened to the upper first shell by means of said pin, so that both of the first shells encompass the base body in cross section, namely in a cross section plane that extends perpendicular with respect to the peripheral or extension direction of the base body, respectively.

Furthermore, the fastening means for fastening the display device to the base body of the steering wheel rim can be formed by a removable glue or can comprise such a glue.

For preventing a relative movement between the display device and the base body said fastening means particularly further comprise a clip connection between the display device and the base body, or in other words, the fastening means comprise structures of the display device, via which a clip connection of the display device to the steering wheel, particularly to the base body, exists.

For supporting components of the display device, the display device particularly comprises at least one circuit support (circuit board) that is particularly fastened to the steering wheel rim, particularly to the base body of the steering wheel rim, by means of said clip connection.

Particularly, the display device comprises damping means for damping mechanical vibrations of the at least one circuit support, wherein said damping means is designed and provided for counteracting a vibration of the display and the circuit support against each other. Thereby, the damping means particularly comprise a mechanically cushioning material that is arranged between the display and the circuit support. Damping means can also be provided between further components of the display device.

Furthermore, in order to advantageously cover the base body of the steering wheel rim in the region of the display device, an upper second and an upper third shell is provided, each comprising a surface facing outwards, wherein these surfaces—with respect to a state of the steering wheel assembly in which the latter is built in a motor vehicle as intended—face a driver.

Thereby, the upper first shell is particularly arranged between the upper second and the upper third shell along the extension direction (peripheral direction) of the steering wheel rim, wherein the upper second shell and the upper third shell are each particularly connected to the lower shell, so that the upper second shell and the upper third shell each encompass together with the lower shell the base body in cross section.

In this respect it is possible to at least partly include the upper second and third shell into a further casing of the steering wheel or the steering wheel rim with leather or another covering. Hereby, with advantage, a concealed transition is provided between a region having high production tolerances (namely the foam surrounding the base body as a first casing) and the upper second and third shell and the display region (display device), which concerning production techniques stands out due to relatively low tolerances.

The above-described shell concept may also be further developed as an independent object of invention, namely based on a steering wheel assembly for a motor vehicle having a steering wheel for steering the motor vehicle, wherein the steering wheel comprises a steering wheel rim, by means of which it can be actuated, and having a display device arranged on the steering wheel rim for displaying driving information, and having a covering part (upper first shell) of the display device by means of which the display device is fastened to the steering wheel rim.

Particularly, the covering part faces the seating place of the driver or a driver in a state in which the steering wheel is mounted into a motor vehicle. Furthermore, the steering wheel rim in turn particularly comprises a base body, that is at least partly surrounded by a casing, wherein the covering part is particularly connected to said casing.

Furthermore, a part is thereby particularly provided that is arranged on a side of the base body facing away from the display device and is connected to the covering part, as well as particularly furthermore a first part, that is arranged on a side of the base body facing away from the display device and is connected to the covering part, and a second and a third part, which are arranged in a direction of the steering wheel rim on opposing sides of the first part.

Finally, in this shell concept the second and the third part are arranged on a side of the base body facing the first part, wherein the second and the third part are particularly connected to the first part, and wherein furthermore the first, second, and the third part are covered together with the basic body and its first casing (base body casing).

The problem underlying the invention is also solved by a method for producing a steering wheel assembly, particularly according to one of the above-stated steering wheel assemblies. The method according to the invention comprises the steps of:

surrounding a base body (steering wheel base body) of a steering wheel rim with a base body casing (e.g. a foam around the base body—also denoted as steering wheel skeleton), in a way, that the base body casing comprises a recess (clearance),
  arranging a first part, particularly in the form of a lower shell, on the base body in the recess or in the region of the recess,
  particularly arranging a second and third part in the form of a second upper and a third upper shell in the region of the recess on a side of the base body that faces away from the first part,
  arranging a display device for displaying driving information in the recess, and
  connecting a covering part, particularly in the form of an upper first shell of the display device, to the lower shell.

Particularly, the second part is arranged opposing a first end of the covering part along an extension direction of the base body, wherein particularly the third part is arranged opposing a second end of the covering part along the extension direction, wherein both ends particularly face each other along the extension direction. Or, in other words, the second part is arranged such that it faces a first end of the first part, and the third part is arranged such that it faces a second end facing the first end along the base body.

Furthermore, in the method according to the invention, before arranging the display device, a further casing is arranged, particularly out of leather, that surrounds at least in sections the base body casing as well as the lower shell (first part).

The further casing thereby particularly surrounds at least in sections the base body casing as well as the lower shell (first part), the upper second and the upper third shell (second and third part).

Or, in other words, in a further development of the method, a further casing (e.g. out of leather) is arranged before arranging the display device, which further casing surrounds at least in sections the base body casing as well as the first part. In a variant the further casing additionally surrounds the second and the third part. In principle, it is also possible that the further casing is attached after arranging the display device.

In a second aspect the invention relates to a steering wheel assembly for a motor vehicle, having a steering wheel for steering the motor vehicle, wherein the steering wheel comprises a steering wheel rim, by means of which it can be actuated, and having a display device arranged at the steering wheel rim for displaying driving information, and having at least one electrical connection device for electrically connecting the display device to an assembly of a motor vehicle, as well as having at least one connection element (e.g. plug), by means of which the display device is electrically connected to the connection device.

Particularly, the connection element is fastened to the steering wheel rim in the region of the display device, and the connection device particularly comprises an electrical cable that extends from the region of the display device to a hub region of the steering wheel. Thereby, said electrical cable is particularly passed along the steering wheel rim.

In order to have an advantageous cable arrangement, the base body of the steering wheel rim that is particularly partly surrounded by the base body casing, particularly comprises a recess (groove), into which the electrical cable is inserted at least in sections. A width of said recess across the peripheral direction of the steering wheel rim or base body, i.e., along of the radial direction of the steering wheel, is at least in sections smaller than the outer diameter of the electrical cable before its insertion into the recess, so that the inserted cable is clamped in the recess. It is of course also possible that the base body comprises regions that protrude into the recess in a way that the cable can engage said regions and is therefore held in said recess. The recess hence comprises particularly at least one structure that counteracts a slipping of the cable out of the recess.

Particularly, also the casing comprises a recess through which the cable is passed at least in sections. Thereby, said recess is particularly covered by a closing element, so that the cable does not become apparent through the casing or can be sensed haptically.

In a further aspect of the invention a steering wheel assembly is provided, having a steering wheel for steering the motor vehicle, wherein the steering wheel comprises a steering wheel rim by means of which it can be actuated, and having a display device arranged on the steering wheel rim for displaying driving information, wherein the control unit for controlling the display device is integrated into the steering wheel.

The control unit can also be designed to control further elements of the steering wheel, particularly a heating element, means for determining the steering angle, an actuating element for actuating a vehicle component or actuators arranged in the steering wheel, e.g. for an active steering.

A further object of the invention relates to a control unit integrated into the steering wheel that is not necessarily provided for controlling the display device, but is generally designed to autonomously process vehicle information.

Furthermore, the invention relates to a steering wheel assembly for a motor vehicle having a steering wheel for steering the motor vehicle, wherein the steering wheel comprises a steering wheel rim, by means of which it can be actuated, and having a display device arranged on the steering wheel rim for displaying driving information.

According to a further aspect of the invention a steering wheel assembly for a motor vehicle is provided, having a steering wheel for steering the motor vehicle, wherein the steering wheel comprises a steering wheel rim, by means of which it can be actuated, having a display device arranged on the steering wheel rim for displaying driving information. Particularly, furthermore, a light emitting element of the display device as well as a reflector element for at least partly reflecting the light emitted by the light emitting element is provided.

For instance, the reflector element is designed and arranged such, that it causes—compared to a light emitting element without the reflector element—a more uniform intensity distribution of the light emitted by the light emitting element in a plane perpendicular to its optical axis. Particularly, in an embodiment of the reflector means an improved lighting of boundary regions of the emitting region of the light emitting element is achieved. Particularly, the light emitting element of the display device is a LED.

Particularly a uniform intensity distribution along a (finite) area oriented perpendicular to the optical axis that is particularly formed longitudinally extended and rectangular (illuminated stripe).

Particularly, the reflector means hereunto comprises a wall in the form of a curved, reflecting area.

Furthermore, the display device particularly comprises a display for generating an optical signal for representing driving information on a display side of the display facing an observer. In this respect, the steering wheel rim is particularly designed such that ambient light for background lighting of the display can get on a side of the display (e.g. LCD) facing away from the display side.

Alternatively or additionally, the steering wheel rim is particularly designed such that ambient light for background lighting can get from the display side facing the observer to a side of the display facing away from the display side.

Furthermore, for the purpose of background lighting it is particularly provided that the base body is at least partly surrounded by a casing having a transparent material in the region of the display, so that in this region ambient light can get through the casing of the steering wheel rim to the display. Particularly, for this, said transparent material faces the vehicle front window pane in a state of the steering wheel assembly in which the latter is built into a vehicle as intended.

Furthermore, the steering wheel rim can comprise a base body that provides for cavities, slits, or transparent materials for direct through-guiding of light, so that in this region ambient light can get to the display through said cavities, slits or transparent materials.

In addition, the steering wheel rim can be equipped with light guiding structures and/or materials in order to guide ambient light to the display.

Alternatively or additionally, a light source for background lighting of the display is provided in a further variant of the invention that is arranged on the side of the display facing away from the display side.

As an alternative to this, the display is formed as a self-luminous display, particularly in the form of an OLED.

According to a further independent object of the invention, a steering wheel assembly for a motor vehicle is provided, having a steering wheel for steering the motor vehicle, wherein the steering wheel comprises a steering wheel rim, by means of which it can be actuated, and having a display device arranged on the steering wheel rim for displaying driving information, and having a display of the display device for generating an optical signal for representing the driving information, wherein the steering wheel rim is designed such that ambient light for background lighting can get on the side of the display facing away from the display side.

In particular, the above stated display can be a transflective display that allows light to pass a front side and reflects it at a rear side for background lighting.

In addition, the steering wheel rim can comprise a base body that is at least partly surrounded by a casing that comprises in the region of the display a transparent material, so that in this region ambient light can get through the casing to the display. The transparent material may e.g. also be colored and it may have arbitrary surface structures, e.g. also a light guiding channel for guiding ambient light.

FIG. 1 shows (in conjunction with FIG. 2) the design of a display device 30 according to the invention in an exploded view. According thereto, the display device 30 comprises a covering part 31—also denoted as first shell 31. Said shell 31 can be particularly produced out of the materials PC, ABS, wood, metal etc. and comprises—with respect to a state of the display device 30 in which the latter is built into a steering wheel 2 as intended—an outwardly facing surface 31a facing a driver, that forms a design surface. The upper first shell 31 further comprises a continuous recess 33 (cut-out 33), through which a display 32 serving for depicting information is visible. Particularly, the display 32 can be an OLED, TFT, LCD or another display.

With respect to said built-in state (which is assumed in the following) a transparent pane covering 90 is arranged along a construction direction A extending perpendicular to the extension plane of the upper first shell 31 between the upper first shell 31 and said display 32, which transparent pane covering 90 closes said cut-out 33 and is particularly scratch—proof and non reflecting, as well as furthermore particularly coated against fogging. Particularly, said pane covering 90 that extends along the upper first shell, consists of PC, ABS, PMMA or PU.

The pane covering 90 and the upper first shell 31 can of course also be provided as an uniform part, i.e., they can be formed integrally.

Furthermore, a frame-shaped sealing 91 is arranged along said construction direction A between the pane covering 90 and the display 32. Thereby, the sealing 91 circulates the display side 32a of the display 32 facing the driver, via which information (optical signals) can be displayed, in order to protect the display 32 or the display side 32a from dust and humidity. In this respect, the pane covering 90 butts against said display 32 via said sealing 91, wherein in the pane covering 90 is pretensioned against the sealing 91, so that the sealing 91 butts against the display 32 as well as the pane covering 90 in a sealing up manner.

The area enclosed by the frame-shaped sealing 91 corresponds concerning its projection onto the pane covering 91 to a region of the latter having a high light-transmissibility or low diffusion (viewshed of the display 32). The boundary regions adjoining thereto comprise a lower light-transmissibility or have a comparatively strong dispersive effect.

The display 32 extends along and extension direction R of the steering wheel rim 20 and is arranged on the latter with respect to a straight-ahead driving direction in the 12 o'clock position. Along said extension direction R a reflector means 71 is arranged on both sides, that is adapted and provided to influence light generated by LEDs 70 in a way, that by means of said LEDs 70 stripe-shaped, homogeneously lighted regions 72 extending along the extension direction R are visible. For this, said pane covering 90 extends with its regions of lower light-transmissibility or strong diffusion, as seen in the construction direction A, in front of said reflector means 71 and LEDs 70 arranged therein. In order to have a better differentiation of the stripe-shaped regions 72 with respect to each other on the pane covering 90, additional partition regions can be provided in or on the pane covering 90, which comprise a very low light-transmissibility. Said cut-out 33 of the upper first shell 31 is designed such, that also the LEDs 70 or the essentially homogeneously lighted regions 72 (illuminated stripes) are visible for a driver through the cut-out 33 on the pane covering 90. Particularly, the reflector means 71 are produced out of PC, ABS or coated plastic. The pane covering 90 can comprise several layers in the region of the reflector means 71, particularly a coated aperture 90a as well as a diffuse film 90b or coating of the aperture, that is arranged along the construction direction A between the reflector means 71 and the coated aperture 90a (cf. FIG. 18).

The display 32 and both reflector means 71 as well as LEDs 70 arranged therein along with a central control unit 100 for controlling the display device 30 are fastened to a circuit support 35 that serves for supporting these components and furthermore provides for an electronic connection between the components of the display device 30.

Furthermore, in order to protect the circuit support 35, a lower covering 92 is provided, that extends along said construction direction A between the circuit support 35 and the base body 21 along the extension direction R. This lower covering 92 particularly consists of PC or ABS.

For electronically connecting the display device 30, particularly the control unit 100 of the display device 32, to a network on the vehicle side (particularly for power supply and for transmitting control signals) a connection element 51 and an electrical connection device 50 connected thereto are provided, wherein said connection device 50 comprises an electrical cable 53, which is adapted and provided for being arranged in a casing 22 (base body casing) of a base body 21 of the steering wheel rim 20. The cable 53 can comprise a plurality of single wires.

Finally, for fastening the display device 30 to a base body 21 of a steering wheel rim 20, a lower shell 34 is provided, having a surface 34b facing outwards that faces away from the driver, wherein said lower shell 34 is particularly arranged on a side 21b of the base body 21 that faces away from the driver or display 32 (cf. FIG. 2). Particularly, the lower shell 34 can be covered by an outer, visible casing 25 of the steering wheel rim 20—also denoted as further casing—which, in particular, can consist of leather. Particularly, such a lower shell consists of PC or ABS.

FIG. 2 shows in conjunction with the FIGS. 3 to 7 the fastening of the display device 32 to a steering wheel rim 20 of a steering wheel 2, which circulates along the extension direction R (peripheral direction). Thereby, the steering wheel rim 20 comprises a base body 21 circulating along the extension direction R as a skeletal structure of the steering wheel rim 20. The base body 21 particularly consists of a metal, but may also be produced out of a plastic. Furthermore, the steering wheel rim 20 comprises a casing 22 out of a material that particularly comprises a higher elasticity than the base body 21, wherein said casing 22 surrounds the base body at least in sections along the extension direction R, i.e., encompasses it in cross section, and is also denoted as base body casing 22. Finally, the steering wheel rim 20 comprises a further casing 25 having a visible surface facing outwards that is applied to the base body casing 22 and surrounds the latter along the extension direction R at least in sections. Particularly, this further casing 25 is a leathers of the steering wheel rim 20.

The base body casing 22 comprises a gap extending along the extension direction R for fastening the display device 30 to the steering wheel, which is located in the twelve o'clock position with respect to a straight-ahead driving position of the steering wheel 20, so that a portion 93 of the base body 21 is not covered by said base body casing 22. From this portion 93 two fastening structures in the form of two fastening regions 41 protrude prolongation-like across the extension direction R, namely towards a hub body 94 of the steering wheel 2, which is connected to the steering wheel rim 20 via at least one spoke 95 of the steering wheel 2. The two fastening regions 41 are arranged at a distance to each other along the extension direction R and comprise a through-opening 42, respectively (e.g. in the form of a borehole), whose aperture plane extends perpendicular to the steering axis of the steering wheel 2.

A fastening means, e.g. in the form of a screw 44, is passed through said through-openings 42, respectively (cf. FIG. 2), which fastening means 44 connect the lower shell 34 and the upper first shell 31 of the display device 30 to each other. For this, two corresponding threads are particularly provided at the upper first shell 31, the screw heads butt against a side 34b of the lower shell 34 facing away from the base body 21. Thus, the two shells 31, 34 can be pressed against each other by means of the screws 44. Since the two screws 44 (fastening means) reach through the through-openings 42 formed in the base body 21, the display device 30 is fastened in a rotationally fixed manner to the base body 21. Furthermore, of course also the circuit support 35 can be fastened between the two shells 31, 34 by means of said fastening means 41, 42, 44 and the sealing 91 can be pretensioned between the pane covering 90 and the display 32 along the construction direction A.

As an alternative or an addition to the above-described screw connection 44 the display device can be fastened to the base body 21 or the steering wheel rim 20 by means of detachable glues which can be detached e.g. by applying ultrasound or heat. In case of glues that can be detached by heat, a heating wire can be provided in the region of the glue connection, whose heat detaches the glue connection. Such detachable connections allow for access to the components of the display device for service purposes.

In order to suppress bendings and vibrations of the circuit support 35 with respect to the base body 21, the circuit support 35 can be additionally connected to the base body 21 by means of a clip connection according to FIG. 3. For this, particularly an engagement hook 45 protrudes along the construction direction A from the circuit support 35 toward the base body 21 and engages with a free end region 45a with a recess 21 provided in the base body 21, so that the circuit support 35 is secured at least along the construction direction A with respect to the base body 21.

Furthermore, the display 32 is particularly elastically connected to the circuit support 35 due to its stiffness compared to the circuit support 35 and the corresponding different eigenmodes (resonant frequencies), namely particularly via damping means 36 that are arranged along the construction direction A between the display 32 and the circuit support 35. These damping means 36 can consist of a glue, which comprises elastic properties in the hardened state. Also the elastic, frame-shaped sealing 91 contributes to decoupling the display 32 from neighboring components of the display device 30.

The FIG. 8 shows in conjunction with the FIGS. 9 to 15 the electronic connection of the display device 30 to one or several vehicle components whose functions and parameter shall be depicted by means of the display device. In general, signals can be exchanged via such a connection device 50 between the display device 30, particularly a control unit 100 of the display device 30, and an electronics on the vehicle side or a further electronics arranged in the steering wheel 2 (e.g. in the hub body 94). For this, the connection device 50 comprises an electrical cable 53 that may comprise a bus line. Furthermore, the electrical cable 53 of the connection device 50 may also serve for providing a supply voltage for the display device 30 (control unit) and may comprise corresponding wires.

According to FIG. 8 the connection device 50 comprises a connection element 51 in the form of a plug that is connected to the electrical cable 53 in an electrically conducting manner, which plug is firmly fastened to said non-covered portion 93 of the base body 21 or alternatively to the lower shell 34. Corresponding contacts in the form of a further plug 52 (cf. FIG. 4) are provided on the display device 30 (e.g. on the circuit support 35 in conjunction with the lower covering 92), which undergo an electrically conducting connection with the plug 51 fastened to the base body 21 or the lower shell 34, when the display device 30 is fastened to the base body 21 or is connected to the lower shell 34. Said connection element 51 can also be provided at a flexible, free moving cable 53 in the region of the display device 30. In this case the electronic connection to the further plug 52 (contacts) on the side of the display device takes place particularly manually before connecting the two shells 31, 34 of the display device 30. An electronic device that shall be releasably fastened in the region of the hub body 94 can be dealt with in the same manner.

According to FIG. 8 the electrical cable 53 runs from said non-covered portion 93 of the base body 21 along the steering wheel rim 20 via a spoke 95 to the hub body 94.

The FIGS. 9 to 15 show by means of schematic sectional views the wiring along the steering wheel rim 20.

For this, a groove 54 (recess) of the base body 21 (skeleton) running along the extension direction R is provided according to FIGS. 9 to 11, in which said electrical cable 53 is arranged, namely before the base body 21 is provided with the base body casing 22 (particularly by foaming the casing), which encloses the electrical cable 53 in the groove 54. The groove 54 can thereby be formed in a way, that the electrical cable 53 according to FIG. 9 is deformed upon arranging it into the groove 54 and is thus held in the groove 54, i.e., is clamped in the groove 54.

Alternatively, the cable 53 can engage with protruding regions 55 (structures) of the groove 54, so that it cannot slip out of the groove 54 (FIG. 10). Finally, the electrical cable 53 can be held in the groove 54 by means of an additional separate fastening means, like for instance an adhesive tape 96, which is therefore arranged on the base body 21, so that it covers the groove 54 in sections (FIG. 11).

Furthermore, according to FIG. 11*a* showing a modification of the embodiment shown in FIG. 11, one may abdicate a groove 54. Here, the electrical cable 53 runs (at least in sections) along a surface of the base body 21 facing outwards, e.g. on a side 21*a* of the base body 21 facing the driver, i.e., along a boundary region of the base body 21 lying outside. The electrical cable 53 is held in this position by means of a separate fastening means, wherein this fastening means particularly is an adhesive tape 96 according to FIG. 11, that covers the cable 53 in sections and thereby fastens it to said side 21*a*.

Alternatively, there is the possibility according to FIGS. 12 to 15 to install the electrical cable 53 onto the base body casing 22 after applying the base body casing 22.

For this, according to FIGS. 12 to 15 a groove 56 (recess) for receiving the electrical cable 53 can be formed in the base body casing 22, particularly by means of a correspondingly shaped foaming mold. The cable 53 can then be pressed into the groove 56 and covered by the further casing 25, wherein a seam 97 extends between front faces of such a further casing 25, which front faces butt against each other and run along the extension direction R aside the cable 53 (FIG. 12).

In case the electrical cable 53 shall extend below such a seam 97, the groove 56 can be closed by foam stripes, so that the electrical cable 53 is enclosed in the groove 56 in cross section (FIG. 13).

Furthermore, according to FIGS. 14 and 15 the electrical cable 53 can be fixed in the groove 56 of the base body casing 22 by means of a clamping stripe 57 (closing element). The clamping stripe 57 can thereby compress the electrical cable 53 and clamp it with the groove 56 (FIG. 15) or encompass the cable 53 and thereby engage with an undercut of the groove 56, so that the clamping stripe 57 is held in said groove 56 together with the electrical cable 53.

FIG. 16 shows by means of a block diagram the individual components of the display device 30 and its control unit 100 (ECU), which serves for controlling the display device 30 and further vehicle components that can be arranged in the motor vehicle or steering wheel 2.

The control unit particularly controls the display 32 and the LEDs 70 of the display device 30 arranged in the reflector means 71. The images that are to be displayed by the display device 30 as well as the controlling algorithms are stored in a separate memory 101 inside or outside the control unit 100 or are transmitted via a vehicle bus or vehicle sensors to the control device 100. An additional driver monitoring device 102 (e.g. in the form of a camera) is also controlled via the control unit 100.

Further devices arranged in the steering wheel 2 like e.g. a steering wheel heating, a steering angle sensor, the lighting, switches, actuators e.g. for an active steering etc., can also be controlled by the control unit 100.

The circuit support 35 supporting the display device 30 and the control unit 100 can be separated into two or several single circuit supports for reasons of distribution of parts or for reasons of temperature. For instance, heat generating parts (LED-driver 103, LEDs 70 etc.) can be connected to the base body 21 of the steering wheel rim 20 via heat dissipating bands due to better temperature dissipation. Hereby, heat can be dissipated or kept away from the heat sensitive parts (e.g. OLED 32).

Other heat generating parts can also be arranged on separate circuit supports (circuit boards) in the region of a spoke 95 of the steering wheel 2 (e.g. due to a lack of installation space or due to their heat generating property).

In principle, the control unit 100 is adapted such, that the steering wheel 2 forms together with sensors, control unit 100 and other actuators and vehicle components an autonomous unit. Thereby, any processing of signals takes place invisible inside the steering wheel 2. Particularly, the control unit 100 is arranged in the steering wheel 2, namely particularly in the steering wheel rim 20, particularly in the display device 30.

Hereby, the complete steering wheel 2 can be installed in every vehicle, wherein the integration into the respective vehicle is uncomplicated and requires in particular no change or adaption of the vehicle architecture. Additional vehicle information can be simply read from the existing vehicle bus. Hereby, diagnosis and other data safety control mechanisms can be directly conducted by the steering wheel 2. Particularly, special steering wheels can be offered as optional equipment for certain vehicle lines.

The display device 30 comprises in detail the following construction according to FIG. 16.

A central control unit 100 (ECU) serves for controlling components of the display device, which control unit can comprise a memory 101 for storing of information. Thereby, the central unit 100 can exchange signals with a bus on the vehicle side via a signal bus 104 connected to the control unit 100, namely by means of a bus transceiver 105. When connections are addressed in the following, connections between electronic parts are meant, via which signals can be transmitted or exchanged. Particularly, said signal bus 104 runs to a bus system on the vehicle side via the steering column.

Furthermore, the control unit 100 is connected to a brightness sensor 106, so that the control unit 100 can control further components connected to the control unit 100 depending on the brightness inside the vehicle. Particularly, such a component can be a display 32 of the display device 30 as well as the LEDs 70 of the display device 30 arranged in the reflector means 71, whose brightness, color and contrast can be controlled in this way depending on the brightness inside the vehicle. For this, the display 32 is connected to the control unit 100 via a display driver 107 and the LEDs 70 via a LED driver 103.

Furthermore, the control unit 100 is connected to a driver monitoring device 102, e.g. in the form of a camera. Thereby, the control unit 100 is adapted and provided to determine a state of concentration by means of a suitable evaluating software and to control further components depending on said state of concentration. For instance, an optical warning can be output to the driver by means of the display 32 in case the control unit 100 determines in an interaction with the driver monitoring device 102, that the driver is tired or does not pay attention to the traffic.

Such warnings can also be output haptically (sensible) or acoustically (hearable) via a corresponding output device (actuator), wherein such output devices (actuators) can also be arranged like the display device 30 in the steering wheel 2.

The parts described above are particularly arranged on said circuit support 35 which is, as described above, (as a part of the display device 30) arranged in the steering wheel rim 20 and can be divided into several circuit supports (circuit boards). Instead of or in addition to the display device 30 the control unit can also control other vehicle components which are particularly arranged in the steering wheel 2, like e.g. a steering wheel heating 108, a lighting 109, switches 110, an actuator 111 for an active steering 112 (eventually including a control electronics of the actuator). Said other vehicle components are particularly not provided on the circuit support 35 of the display device 30.

Finally, the control unit 100 is also able to receive and process signals from the further sensors. These sensors can also be arranged on the steering wheel 2. Particularly, these sensors are a steering angle sensor 113, by means of which a steering angle (turning angle of the steering wheel) of the steering wheel 2 can be detected, and a steering angle acceleration sensor 114, by means of which it can be detected how fast a steering angle of a steering wheel 2 changes. Particularly, said further sensors are not arranged on said circuit support 35.

For power supply, the control unit 100, the display 32, the LEDs 70, the brightness sensor 106, and the driver monitoring device 102 are connected via a mains adapter 115 (eventually having an overvoltage protection) to an energy source on the vehicle side.

FIG. 17 shows in conjunction with the FIGS. 18 to 21 the reflector means 71 of the display device 30 with the LEDs 70 arranged therein. The main task of the reflector 71 consists in a lateral delimitation of the light of the LEDs 70, so that illuminated stripes 71 result, i.e., the two reflector means 71 are designed to influence the beam path of the LEDs 70 in a way, that homogeneously illuminated stripes 72 are visible for the driver in the plane of the pane covering 90, which stripes particularly extend along the first direction R.

According to FIG. 17 the length of said stripes 72 along the extension direction R increases towards an outer periphery 98 of the steering wheel rim 20. For generating the illuminated stripes 72, the reflector means 71 comprise recesses 99 extending along the extension direction R, respectively, in which the LEDs 70 are equidistantly arranged along the extension direction R.

The FIG. 18 shows said recesses 99 in a sectional view along the line A-A of the FIG. 17. According thereto, the recesses 99 comprise a bottom 99a extending along the extension direction R, respectively, which faces a driver, as well as two walls 99b, 99c (reflection walls), respectively, facing each other across the extension direction R, at which walls the light beams of the LEDs are reflected towards the pane covering 90. The walls 99b, 99c go off the bottom 99a and thereby diverge in a defined manner. Furthermore, each recess 99 comprises a circulating boundary region 99d delimiting the respective recess 99 in a plane that runs parallel to the plane (spaced apart about the thickness of the sealing 91) along which the display side 32a of the display 32 extends. Said pane covering 90 can rest on these boundary regions 99 (the pane covering 90 covers the recesses 99), so that said illuminated stripes 72 are generated for the driver in the extension plane of said pane covering 90.

Two possibilities of the divergence of the walls 99b, 99c are shown in the FIGS. 20 and 21. According thereto, a cross sectional contour of the walls 99a, 99b is designed such in a cross section oriented perpendicular to the extension direction, which cross section is shown in said FIGS., that the density of reflected light beams at the boundary region 99d is especially high. This leads to a more homogeneous lighting of said illuminated stripes 72 or of a corresponding region 72 of the pane covering 90. By using multicolored LEDs 70 or by a alternately arranging LEDs of different color, for example of red and green LEDs 70 along the bottom 99a of said recesses 99, a red or a green illuminated stripe 72 can appear at the same position, i.e., in the same region 72 of the pane covering 90, at different times.

The reflector means 71 can also be optimized regarding the uniform lighting of the illuminated stripes 72. Particularly, the shape of the reflector means 71, particularly the shape of the recesses 99, must be adjusted for each LED type, since different LED types comprise different radiation characteristics.

Due to the upward orientation of the light (in the viewing direction of the driver), i.e., parallel with respect to the direction of construction A, the illuminated stripe 72 appears to be brighter.

By using multicolored LEDs 70 or by alternately arranging red and green LEDs 70 along the bottom 99a of said recess 99 a red or a green illuminated stripe 72 can appear at the same position, i.e., at the same region 72 of the pane covering 90, at different times.

Figure 22:
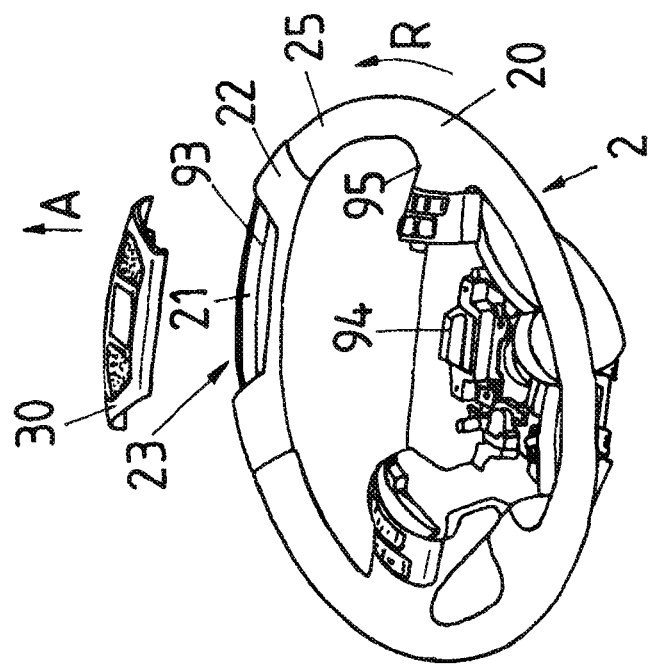
Figure 24:
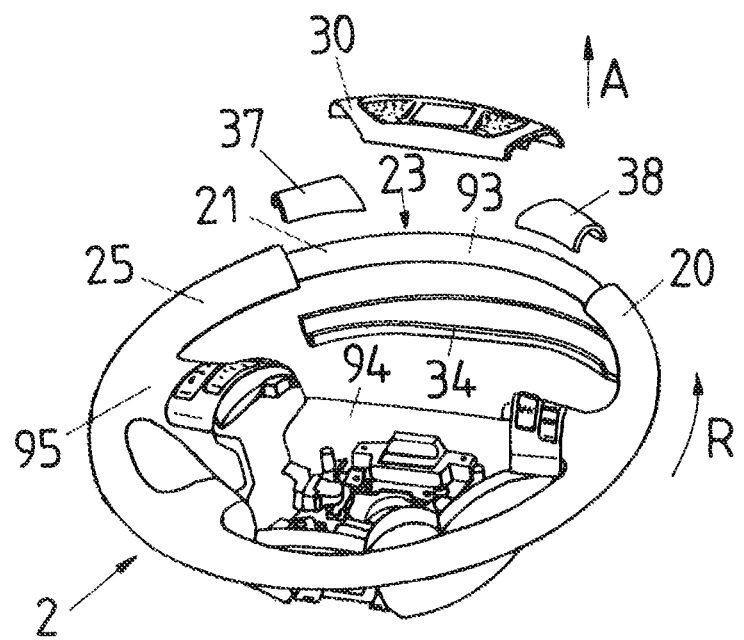

The FIGS. 22 to 24 show different concepts of a mechanical connection between the display device 30 and the steering wheel rim 20 in perspective exploded views.

According to FIG. 22 the base body casing 22 is designed such along the extension direction R of the steering wheel rim 20, that a portion of an upper side 21a of the base body 21 facing the lower covering 92 along the construction direction A is not covered by the base body covering 22, while a corresponding portion of a lower side 21b of the base body 21 facing away from said upper side 21a is covered by said base body casing 22. I.e., the base body casing 22 comprises a corresponding recess 23 (clearance), into which the display device 30 is inserted, so that the upper side 31a of the upper first shell 31 facing the driver is flush with an outer surface of the base body casing 22 delimiting the recess 23 or a leathers 25 of the base body casing 22, respectively.

In contrast thereto, said portion 93 of the base body 21 is completely free according to FIG. 23, i.e., is not covered (surrounded) by the base body casing 22. In order to cover said portion 93 of the base body 21 the lower shell 34 is provided, which covers the base body 22 on the side of the portion 93 of the base body 21 facing away from the driver. Thereby, the display device 30 and the lower shell 34 are fastened such to the base body 21, i.e., arranged in said recess 23 of the base body casing 22, that the surface 31a of the upper first shell 31 facing the driver as well as the surface 34b of the lower shell 34 facing away from the driver is flush with an outer surface of the base body casing 22 delimiting the recess 23 of the base body casing 22 or a leathers 25 of the base body casing 22, respectively.

According to FIG. 24 an upper second shell 37 and an upper third shell 38 is additionally provided with respect to the arrangement shown in FIG. 23. These two shells 37, 38 are arranged on both sides (along the extension direction R) of the upper first shell 31 and serve as tolerance compensation. The lower shell 34 thereby comprises now a length along the base body 21, that corresponds to the sum of the length of the upper three shells 31, 37, 38 (up to tolerances). Thus, the first, second and third upper shells 31, 37, 38 encompass the base body 21 on a side 21a facing the driver and the lower shell 34 on a side 21b of the base body 21 facing away from the driver. Thereby, the shells 31, 37, 38 and 34 are fastened such to the base body 21, that the entirety of these shells enclose said portion 93 of the base body 21 in cross section (eventually up to distances between opposing front faces of the shells 31, 37, 38).

The FIGS. 25 to 30 show a possibility for producing a steering wheel assembly 1 according to the invention by means of the 4-shell concept shown in FIG. 24.

Figure 25:
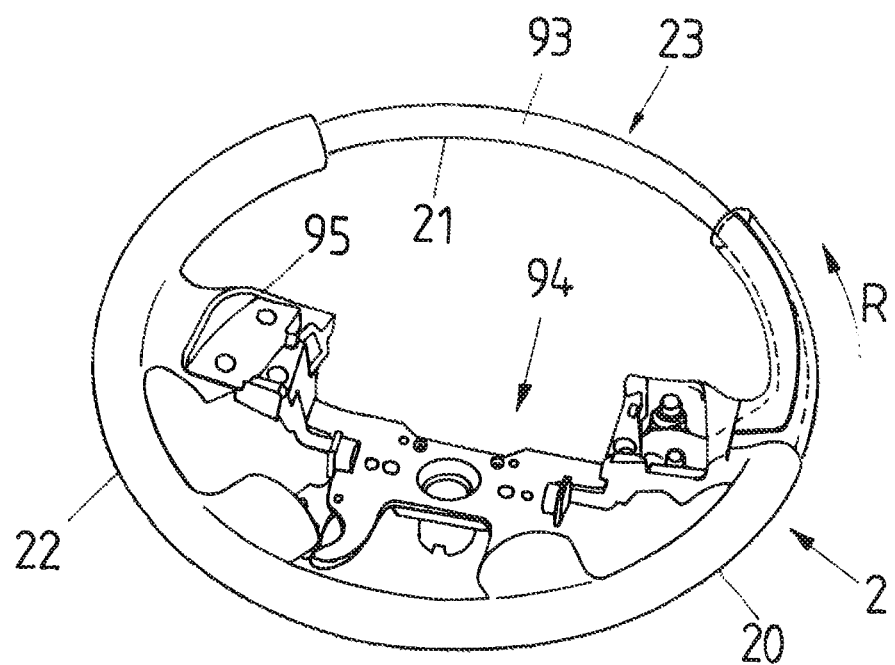
FIGS. 25-30 show perspective views of a steering wheel during different production steps.
Figure 26:
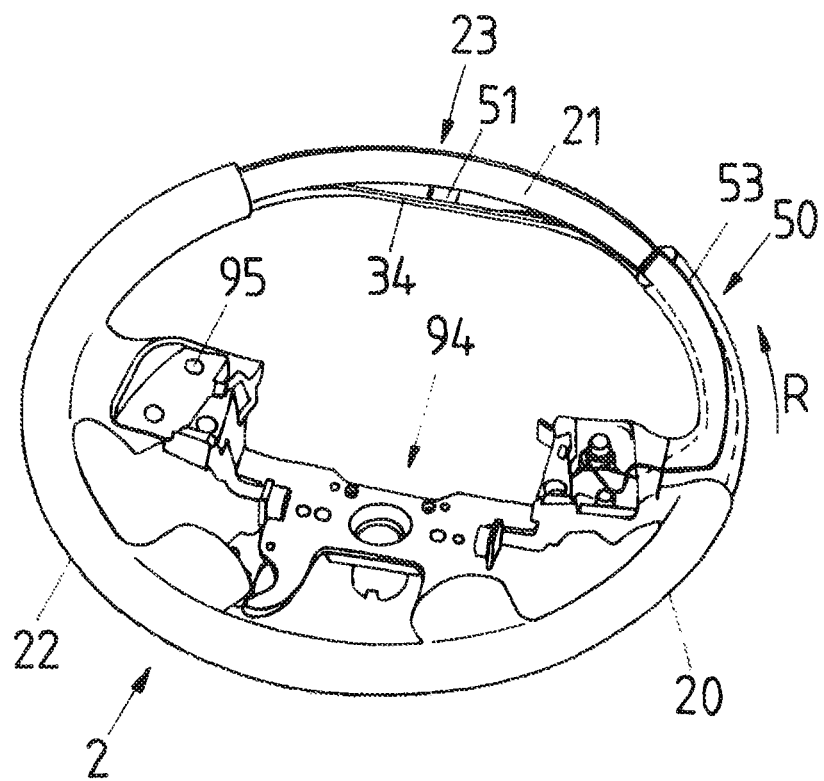
Figure 27:
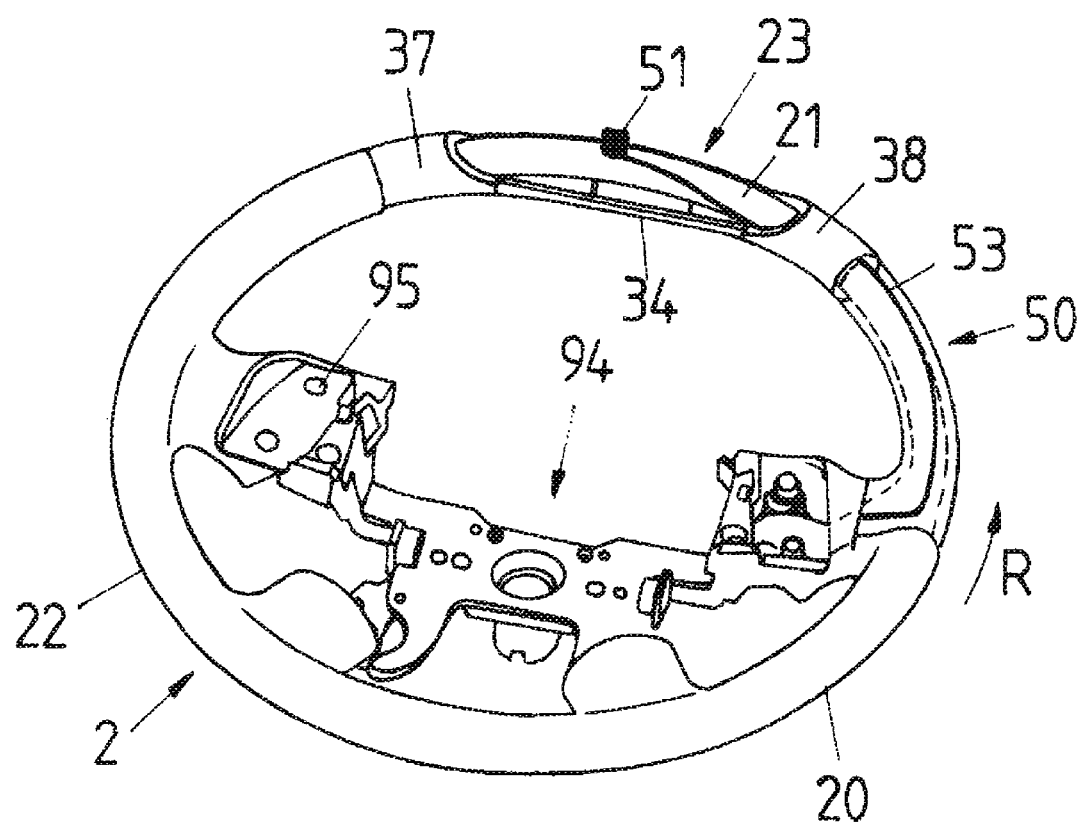
Figure 28:
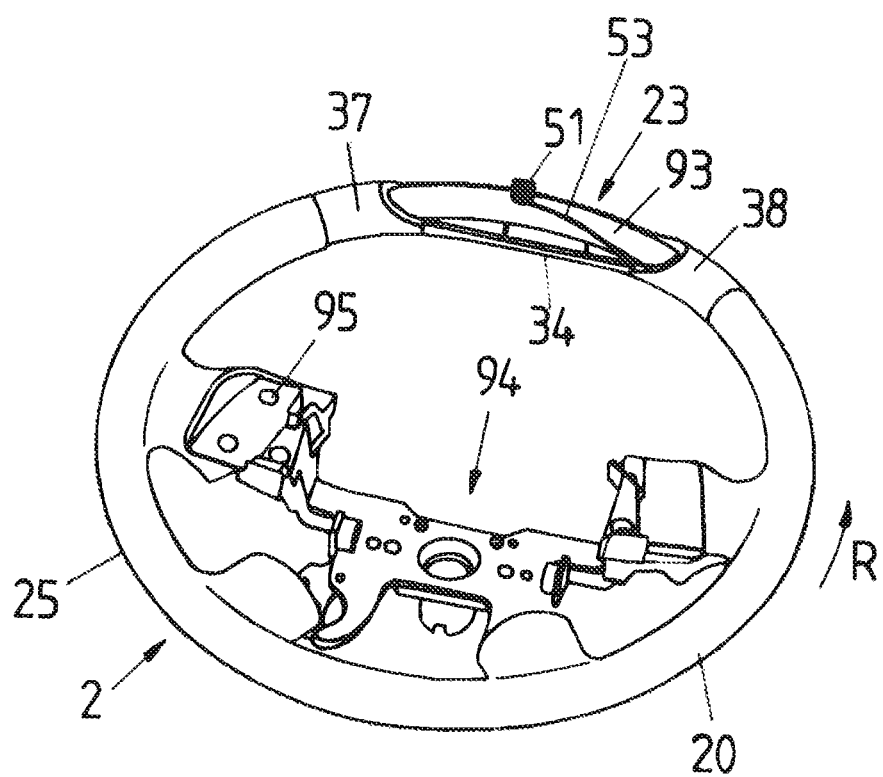

In a first step according to FIG. 25 a base body casing 22 is applied on a base body 21 of a steering wheel rim 20, which also provides for a base body of a hub body 94 of the steering wheel 2 and for spokes 95 of the steering wheel 2, which connect the hub body 94 to the steering wheel rim 20, namely by means of foaming the base body 21 in a suitable foaming mold. Here, the base body casing 22 receives a groove 56 (slit) for receiving the electrical cable 53 (the foam on the right-hand side of the FIG. 25 is depicted as being transparent for clarification).

The base body casing 22 is designed such that a recess 23 of the base body casing 22 is generated in the 12 o'clock position in a way that said portion 93 of the base body 21 is exposed.

The lower shell 34 (first part) is inserted into said recess 23 on a side 21b of the base body 21 facing away from the driver. This takes place together with the insertion of the electrical cable 53 and the plug 51.

Then, the upper second shell 37 and the upper third shell 38 (so called "splits" or lateral shells or second and third part) are inserted into the recess 23 on a side of said portion 93 of the base body 21 facing the driver and are connected to the lower shell 34 and/or the base body 21.

Subsequently, a leathers (further casing 25) is applied to the base body casing 22 of the steering wheel 2, which particularly covers the lower shell 34 and/or the upper second and third shell 37, 38.

Figure 29:
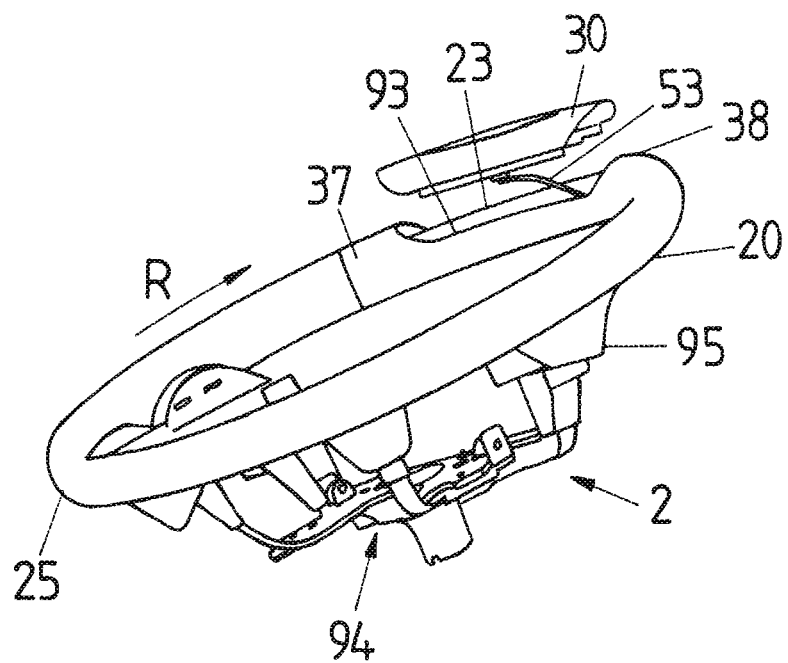
Figure 30:
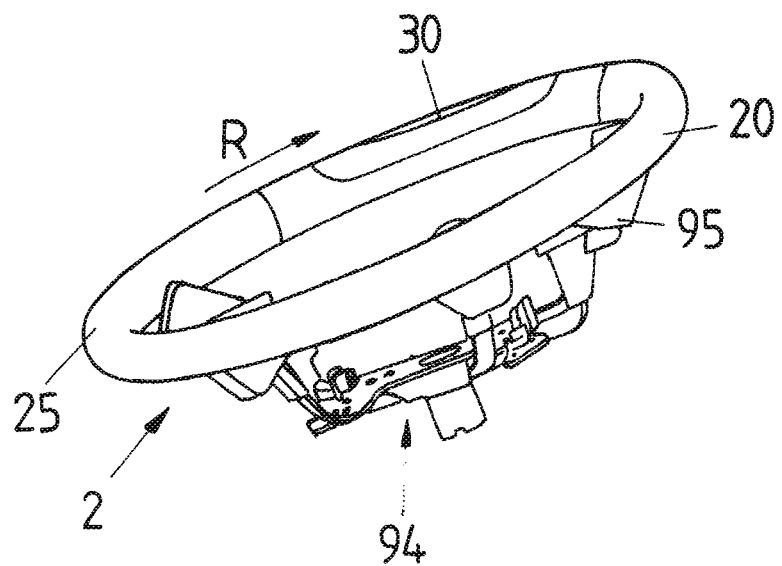

Finally, the display device 30 is connected via set plug 51 to the electrical cable 53 and is inserted into the recess 23 of the base body casing 22 according to FIGS. 29 and 30. Thereby, the display device 30 can be glued into the recess 23 or can be fastened to the base body 21 according to FIGS. 2 to 6.

The FIGS. 31 to 36 respectively show in a fragmentary plan view a display device 30 according to the invention having differently designed displays 32 and illuminated stripes 72 (LED arrangements).

According to FIG. 31 the illuminated stripes 72 extend along the extension direction R on both sides of the display 32 along the extension direction R, wherein the length of the illuminated stripes 72 increases towards the outer periphery 98 of the steering wheel rim 20. With respect to the display 32, which—as already described—is arranged on the steering wheel rim 20 in the 12 o'clock position, the illuminated stripes 72 are mirror-symmetrically arranged. This mirror-symmetrical arrangement is also present in the FIGS. 32 to 42.

According to FIG. 32 the illuminated stripes 72 are inclined with respect to the extension direction R so that they comprise a lower distance to the display 32 adjacent to the outer periphery 98 of the steering wheel rim 20 (along the extension direction).

According to FIG. 33 the illuminated stripes 72 extend in contrast to FIG. 31 across the extension direction R parallel to the lateral boundaries of the display 32.

According to FIG. 34 the illuminated stripes 72 extend longitudinally along the extension direction R, wherein the illuminated stripes 72 lying next to the outer periphery 98 of the steering wheel rim 20 comprise a triangle-shape on each side of the display 32 having an apex pointing towards the outer periphery 98, respectively.

According to FIG. 35 illuminated stripes 72 of equal length extending along the extension direction R are provided.

In the FIGS. 31 to 35 those illuminated stripes 72 which comprise the smallest distance to the outer periphery 98 of the steering wheel rim 20, i.e. lie above the other illuminated stripes 72 along the vertical vehicle axis (with respect to a straight-ahead driving position of the steering wheel rim) are particularly lighted red. The illuminated stripes 72 lying below are particularly lighted green.

Figure 36:
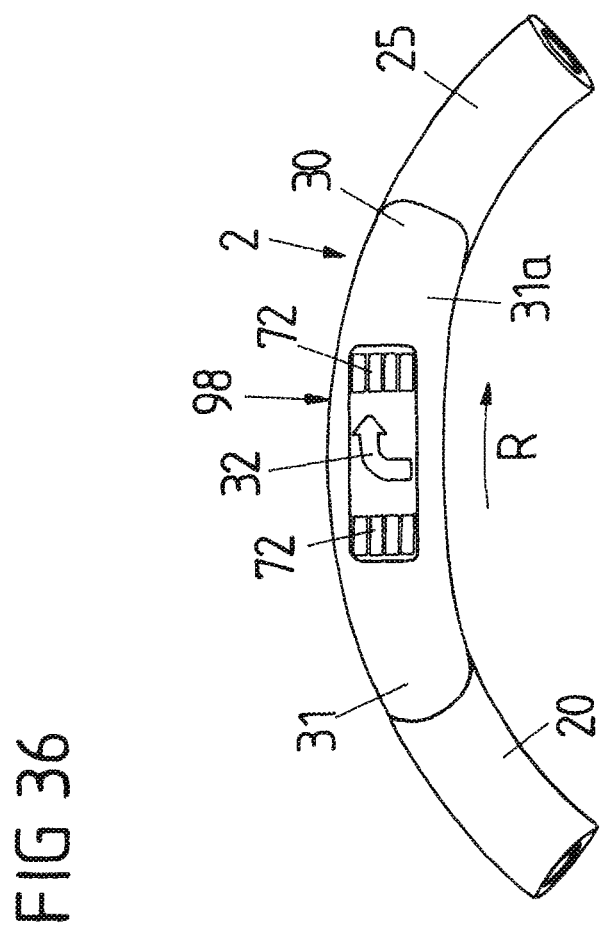

The arrangement according to FIG. 36 shows a display device 30, in case of which, in contrast to the preceding embodiments, the illuminated stripes 72 are an integral part of the display 32.

The illuminated stripes 72 shown in the FIGS. 31 to 35 are particularly generated by a plurality of LEDs 70, respectively. By using multicolored LEDs 70 or by alternately applying red and green LEDs 70, a red or green illuminated stripe 72 can appear at the same position at different times. The illuminated stripes 72 may thereby serve for instance to signalize a distance to an object (e.g. a vehicle driving ahead).

The kind of the respectively provided LEDs 70 differs depending on the variant. For instance, multicolor LEDs 70 or single-color LEDs 70 of different color, which are alternately arranged, can be used.

Figure 37:
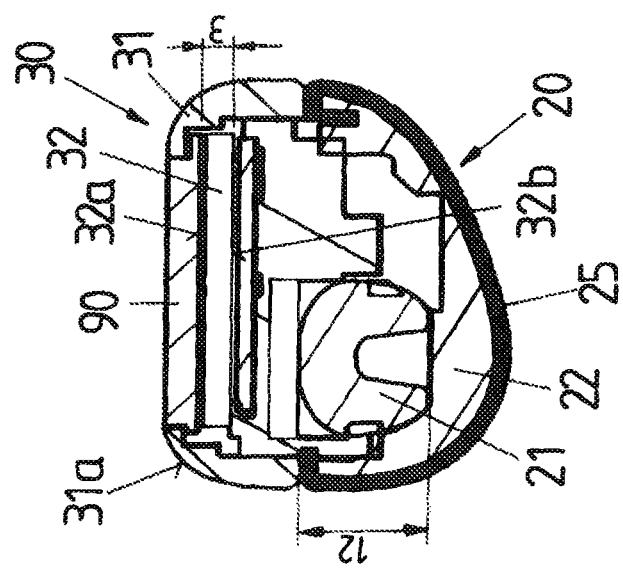
FIG. 37 shows a schematical sectional view of a steering wheel rim and a display device mounted thereto having a display in the form of a self-luminous display.
Figure 38:
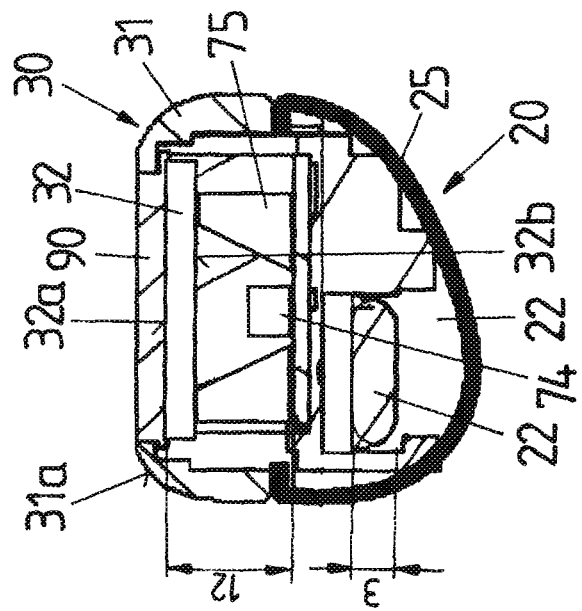
FIG. 38 shows a schematical sectional view of a steering wheel rim and a display device mounted at it having a display in the form of a background-lighted display.

The FIGS. 37 and 38 respectively show a sectional view of a steering wheel rim 20 of a steering wheel assembly 1 according to the invention, namely a cut through the display 32 of the display device 30.

Regarding displaying of information, a very bright display 32 is advantageous with respect to a good visibility in the sun light. Displays 32 in the form of TFT or LCD displays require a background lighting in order to achieve a certain brightness. This background lighting must have a certain distance to the display 32 in order to have a homogeneous lighting. Thus, it requires additional space along the construction direction A, which has to be subtracted from the base body 21 (skeleton), so that the display 32 does not protrude too far beyond the steering wheel rim diameter. Thus, the base body cross section becomes smaller.

Another possibility relates to the use of transflective displays 32. The latter use the incident light for their lighting. The sun light shines through the display 32, is reflected on a rear side 32b of the display 32 and then contributes to the lighting of the display 32.

When using transparent material for the foam 22 and the lower shell 34 the sun light can also hit the display 32 from behind (from the front in the vehicle direction) and contribute to its lighting. For this, narrow base bodies 21 (skeleton) or base bodies 21 having gaps for the passage of light are provided. Alternatively, the light can also be guided from the rear side of the steering wheel rim 20 around the base body 21 by means of light guiding stripes to the rear side 32b of the display 32.

According to FIG. 37 the display 32 is formed as a self-luminous display 32, e.g. in the form of an OLED. The latter can be connected to the circuit support 35 via elastical damping means 36 (cf. FIG. 6).

Alternatively, instead of the self-luminous display 32, a background lighting in the form of at least one LED 74 arranged in a reflector means 75 that is eventually fastened to the circuit support 35 is provided according to FIG. 38 along the construction direction A between the display 32 and the circuit support 35. Said reflector means can be designed in cross section as shown in FIG. 20 or 21, since also here a particularly homogenous background lighting is desirable.

The background lighting can also be designed as an EL-film (electroluminescence film). In case of such a film, illuminating pigments are arranged in a plane volume between two plane electrodes extending along the film plane. These pigments are excited to illuminate by the electrical field between the electrodes.

Figure 39:
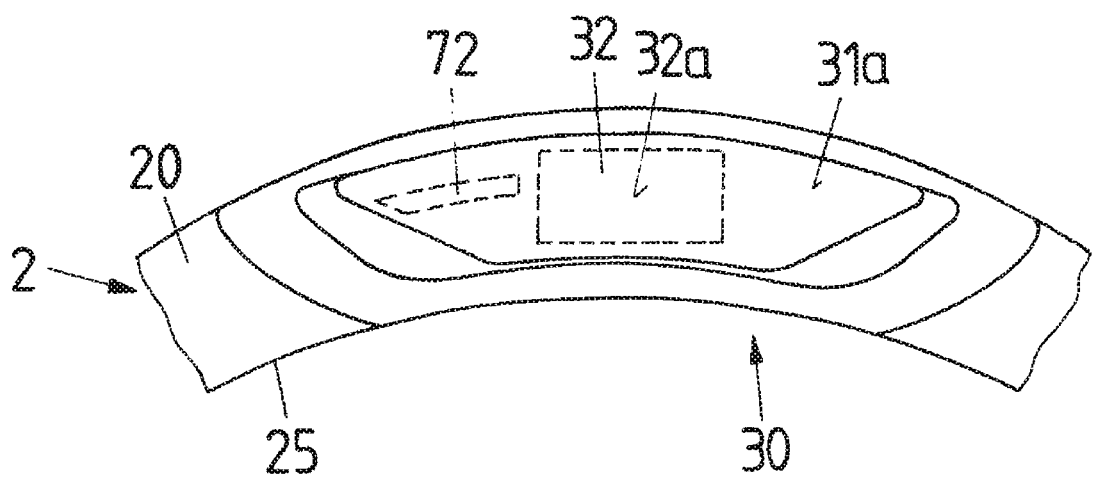
FIG. 39 shows a fragmentary plan view onto a display device according to the invention having a translucent upper first shell.

According to FIG. 39 the upper first shell 31 can be produced such that it provides for a homogeneously appearing, outer (visible) surface 31a, wherein the display 32 and the LED 70 are only visible for a driver (beholder) in case optical information is displayed by means of these components. Thus, the surface 31a forms an area, on which merely optical information appears. However, the displaying means are not visible (image transmissibility). Such surfaces 31a are so called translucent (light-transmissive or partly light-transmissive) surfaces, which can be generated by a suitable coating of a surface. In contrast to transparent (vision-transmissive and image-transmissive) surfaces these surfaces are however not vision-transmissive). Particularly, such translucent coatings are partly light-transmissive metal coatings that are particularly applied on a plastic support (upper first shell). It is also possible to coat other materials in this way.

Figure 40:
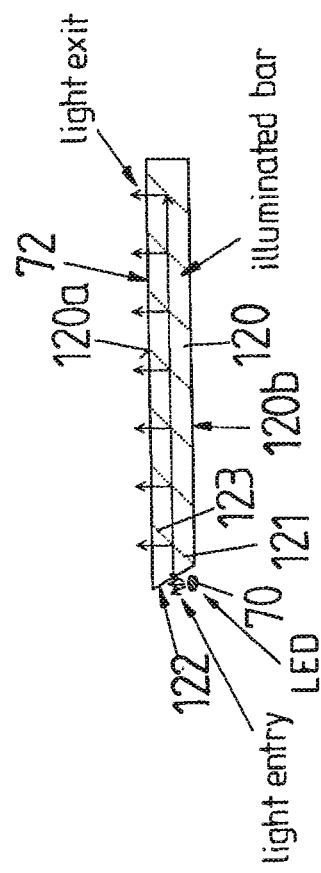
FIG. 40 shows a schematic view of an illuminated bar for a display of a display device according to the invention.

According to FIG. 40 also illuminated bars in the form of prism bars 120 can be used instead of the reflector means 71 shown in the FIGS. 17 to 21. In case of an arrangement of the kind shown in FIGS. 17 to 21 such a prism bar 120 extends along the extension direction R (instead of the recesses 99 or reflector means 71) for constructing an illuminated bar 72 (illuminated stripe). The prism bar 120 comprises a first free end 121 having a front face 122 that encloses an acute angle with a (visible) upper side 120a of the prism bar 120 facing a driver and an obtuse angle with the lower side 120b of the prism bar 120 facing the upper side 120a. The front face 122 forms an entry surface through which light beams emitted by an LED 70 arranged at the front face 122 can get into the prism bar 120. Furthermore, the prism bar 120 comprises a plurality of parallel interfaces 123 along the extension direction R, at which the light that gets into the prism bar 120 via the entry surface 122 is partly reflected towards the upper side 120a of the prism bar 120, so that it leaves the prism bar 120 through said upper side 120a. Hereby, the upper side 120a of the prism bar 120 forms a homogeneously lighted illuminated bar 72.

Figure 41:
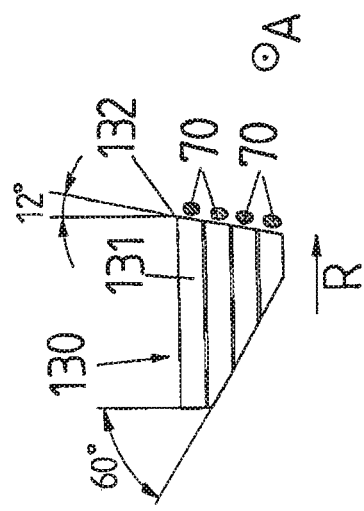
FIG. 41 shows a schematical drawing of LED light guides for a display of a display device according to the invention.

According to FIG. 41 also so called LED light guides 130 can be used instead of the reflector means 71. Here, an illuminated stripe 72 is formed by a corresponding stripe 131 of such a light guiding film 130, wherein at a free end 132 of such a stripe 131 a LED 70 is integrated into said film 130 (the LEDs are schematically shown in FIG. 1 outside said stripe 131 for reasons of illustration). It is of course possible to light a plurality of such film stripes 131 by merely a single integrated LED 70. According to FIG. 41 four such film stripes extending along the extension direction R are provided having a LED 70 provided on a free end 132 of a film stripe 131, respectively.

In the text above the following abbreviations were used, ABS (acrylonitrile-butadiene styrene), OLED ("organic light emitting diode"), PC (polycarbonate), PMMA (polymethylmethacrylate), PU (polyurethane) and TFT ("thin film transistor").

The priority application, German Patent Application No. 10 2007 043 008.8, filed Sep. 6, 2007 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The invention claimed is:

1. A steering wheel assembly for a motor vehicle, comprising
   a steering wheel for steering the motor vehicle, wherein the steering wheel comprises a steering wheel rim by means of which the steering wheel can be actuated, and
   a display device arranged on the steering wheel rim for displaying driving information, which comprises at least one display for generating optical signals, wherein
   the display device is fastened to the steering wheel rim by means of a fastening means,
   wherein the steering wheel rim comprises a base body which is at least partly surrounded by a material that is particularly softer than a material of the base body, and
   wherein the display device is fastened to the base body by means of the fastening means, and wherein the fastening means comprises at least a fastening region formed on the base body, wherein the at least one fastening region protrudes from the base body and comprises at least one through-opening, particularly in the form of a borehole, for providing a form-fit and/or force-fit connection between the display device and the base body, and the steering wheel rim extends in a circumferential direction and the steering wheel comprises a hub body which is connected to the steering wheel rim via at least one spoke of the steering wheel, wherein the at least one fastening region protrudes radially inwardly away from the steering wheel rim generally perpendicular to the circumferential direction towards the hub body.

2. The steering wheel assembly according to claim 1, wherein the display device comprises an upper first shell having a visible surface facing outwards, that, with respect to a built-in state of the steering wheel assembly, faces an operator seat.

3. The steering wheel assembly according to claim 2, wherein the upper first shell comprises a cut-out or a transparent or a translucent region, so that said optical signals are visible.

4. The steering wheel assembly according to claim 2 or 3, wherein the upper first shell is fastened to the base body by means of a pin reaching through the through-opening, wherein the pin is formed as a screw.

5. The steering wheel assembly according to claim 2, wherein a lower shell having a visible surface facing outwards is provided, and the visible surface faces away from the surface of the upper first shell.

6. The steering wheel assembly according to claim 4, wherein a lower shell is fastened to the upper first shell by means of the pin, so that both of the shells encompass the base body in cross section.

7. The steering wheel assembly according to claim 1, wherein the fastening means comprise a clip connection between the display device and the base body for preventing a relative movement between the display device and the base body, and particularly that the display device comprises at least one circuit support, and in that the circuit support is fastened to the steering wheel rim by means of the clip connection.

8. The steering wheel assembly according to claim 1, wherein the display device comprises a circuit support as well as damping means for damping mechanical vibrations of the circuit support, wherein particularly the damping means counteract a vibration of the display device and the circuit support against each other, and wherein particularly the damping means comprise a mechanically cushioning material, that is arranged between the display device and the circuit support.

9. The steering wheel assembly according to claim 1, wherein an upper second and an upper third shell for covering the base body, each having a surface facing outwards, which surfaces, with respect to a built-in state of the steering wheel assembly, face an operator seat.

10. The steering wheel assembly according to claim 9, wherein the upper first shell is arranged between the upper second and the upper third shell along an extension direction of the steering wheel rim.

11. The steering wheel assembly according to claim 5, wherein an upper second shell and an upper third shell are each connected to the lower shell, so that the upper second shell and the upper third shell encompass together with the lower shell the base body in cross section.

12. The steering wheel assembly for a motor vehicle according to claim 1, further comprising
at least one electrical connection device for electrically connecting the display device to an assembly of the motor vehicle; as well as
at least one connection element, by means of which the display device is electrically connected to the connection device.

13. The steering wheel assembly according to claim 1, wherein the display is configured for displaying driving information on a display side of the display facing an operator seat, wherein the base body of the steering wheel rim includes a region comprising cavities, slits or transparent materials for direct through-guiding of light such that in this region light for background lighting reaches a back side of the display.

14. The steering wheel assembly according to claim 1, wherein the display is configured for displaying driving information on a display side of the display facing an operator seat, and wherein a light source for background lighting of the display is provided on a back side of the display.

15. The steering wheel assembly according to claim 1, wherein the display is formed as a self-luminous display.

* * * * *